(12) United States Patent
Holder et al.

(10) Patent No.: US 8,753,182 B2
(45) Date of Patent: *Jun. 17, 2014

(54) INTERACTIVE LEARNING USING AN ADVISORY SERVICES NETWORK

(75) Inventors: Warwick Holder, Redmond, WA (US); Pallaw Sharma, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

This patent is subject to a terminal disclaimer.

(21) Appl. No.: 13/283,720

(22) Filed: Oct. 28, 2011

(65) Prior Publication Data

US 2013/0109452 A1 May 2, 2013

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G06Q 30/02* | (2012.01) |
| *G06Q 50/00* | (2012.01) |
| *G06Q 10/10* | (2012.01) |
| *A63F 13/12* | (2006.01) |

(52) U.S. Cl.
CPC .............. *G06Q 30/02* (2013.01); *G06Q 50/01* (2013.01); *G06Q 30/0201* (2013.01); *G06Q 10/101* (2013.01); *A63F 13/12* (2013.01); *A63F 2300/407* (2013.01); *A63F 2300/8064* (2013.01)
USPC .................................. 463/9; 463/42

(58) Field of Classification Search
CPC .............. A63F 13/12; A63F 2300/552; A63F 2300/402; A63F 2300/538; A63F 2300/407; A63F 2300/577; A63F 2300/513; A63F 2300/534; A63F 2300/535; A63F 2300/572; A63F 2300/69; A63F 2300/554; A63F 2300/531
USPC ............................. 463/42; 725/133
See application file for complete search history.

(56) References Cited

U.S. PATENT DOCUMENTS

| | | |
|---|---|---|
| 2006/0204942 A1 | 9/2006 | Kimball |
| 2008/0235154 A1 | 9/2008 | Jones |
| 2009/0263777 A1 | 10/2009 | Kohn |
| 2010/0028846 A1 | 2/2010 | Cohen |

OTHER PUBLICATIONS

Capcom, "Phoenix Wright: Ace Attorney," Oct. 11, 2001, Capcom, game manual.*
James H. Brown, Work-related Outcomes for Instructors using Asynchronous Learning Networks; Aug. 29, 2011, http://radicalpedagogy.icaap.org/content/issue2_2/browne.html.

(Continued)

*Primary Examiner* — Kevin Y Kim

(74) *Attorney, Agent, or Firm* — Patricia Sellers; Jim Ross; Micky Minhas

(57) ABSTRACT

Interactive learning techniques are provided for using serious games as a learning tool. Using serious games as a learning utility improves the ability of employees to learn complex business challenges facing its customers or employer by providing contextual data through play. Players evaluate evidence for relevancy in its ability to form solution concepts. Evidence can encompass first hand interviews, videos and documents rich in contextual data generated directly by a customer or other employees. Solution concepts can then be identified or generated that encompass relevant evidence items and disregard irrelevant evidence items. Players of the interactive learning game can implement solution concepts and provide feedback regarding the outcome. Feedback can be used to create a new evidence item allowing solution concepts to evolve in increasing efficiency.

20 Claims, 18 Drawing Sheets

(56) References Cited

OTHER PUBLICATIONS

James H. Brown, et al., Inspired eLearning; Aug. 29, 2011; http://www.inspiredelearning.com/.

Employee Training Video Production, Aug. 29, 2011, http://www.ludlowmedia.com/employee-training-video-production.php.

Training Your Employees, Aug. 29, 2011, http://enterprise.hughes.com/business-challenges/by-business-need/reaching-your-employees.

Master Control Compliance; http://www.mastercontrol.com/resources/training/software_training_application.html.

ELearners; http://www.elearners.com/online-degrees/.

Apple Pro Training; http://www.apple.com/software/pro/training/self_paced.html; http://training.apple.com/howtolearn.

Work Outs for You; http://www.workoutsforyou.com/.

Ribbon Hero; http://www.officelabs.com/ribbonhero?WT.mc_id=1015.

Microsoft Tuva; http://research.microsoft.com/apps/tools/tuva/.

Master Control Compliance; copyright 2000-2011, reference copy dated Aug. 29, 2011; http://www.mastercontrol.com/resources/training/software_training_application.html.

Eleamers; Aug. 29, 2011; http://www.eleamers.com/online-degrees/.

Apple Pro Training; http://www.apple.com/software/pro/training/self_paced.html; Aug. 29, 2011; http://training.apple.com/howtolearn.

Work Outs For You; copyright 2002-2010, reference copy dated Aug. 29, 2011; http://www.workoutsforyou.com/.

Ribbon Hero; copyright 2011, reference copy dated Aug. 29, 2011; http://www.officelabs.com/ribbonhero?WT.mc_id=1 015.

Microsoft Tuva; 2009; http://research.microsoft.com/apps/lools/tuva/.

* cited by examiner

INTERACTIVE LEARNING USING AN ADVISORY SERVICES NETWORK

TECHNICAL FIELD

The subject disclosure relates to an interactive learning system, within an advisory services network, that provides for players to review and rank evidence and solution concepts to experience a deeper contextual asynchronous learning program.

BACKGROUND

In enterprise business, the importance of information technology (IT) is ever increasing. Large enterprise organizations rely more and more on robust technology products and related services to support their businesses. Over the past several decades, a large consulting services industry has developed to support and service these large enterprise organizations. Typically, consulting organizations apply one model in executing consulting services. This model involves top-performing, senior level consultants developing customer service partnerships with large enterprise organizations. The senior level consultants leverage a large number of junior consultants to design IT solutions. This model, however, is not easily scalable, it is labor intensive and thus expensive, and does not guarantee quality results. In addition, consulting organizations attempt to leverage previous solutions, developed for other customers, as a means for raising profit margins. This approach leads to non-differentiated solutions which partially address core problems of the enterprises.

Enterprise organizations seek the assistance of consultants to identify, analyze, and solve complex business problems. Complex business problems, as the name suggests, can be extremely complex, and result from various factors. For instance, complex business problems can arise from a series of business changes, rapid growth of businesses, technology changes, and/or technological limitations.

Enterprise organizations, who understand their businesses to a greater extent than consulting firms, desire a collaborative approach in which the enterprise organizations and consulting firms work closely to develop creative business solutions for complex problems. Accordingly, it can be beneficial to leverage business knowledge, held by the enterprise organizations, to immerse a team of consultants into the problems faced by the enterprise organizations in order to develop effective solutions.

One possible immersion mechanism is "serious" games. Serious games can encompass many forms and subject matters and teach players information relating to education, health, science, law and government, computers, and/or a multitude of other subjects. Serious games can be used to immerse a team of consultants or employees into the problems faced by the enterprise organizations to develop effective solutions.

Another challenge with consulting services and immersion mechanisms arises with training new or existing consultants or employees. As businesses grow in size, their ability to communicate, train, and share customer knowledge and experiences with employees become more difficult and more expensive over time. There exists a need to share the experiences of employees and consultants already experienced in developing solutions to complex problems previously faced by the enterprise organization. However, experienced consultants and employees are often more valuable continuing to engage in current problems than in training new consultant or employees.

The current method to train employees through in-person seminars and training courses is slowly decreasing while on-line learning systems are increasing as a preferred training environment. Employees can take online training classes from any location and when it is most convenient for them, which is proving cost-effective. Employees can also review courseware materials, take quizzes, or practice tests online, as many times as they want, until the subject matter is mastered. While online training is replacing in-person training as the preferred training environment, online training can be less flexible than in-person training in that conventional online learning systems apply a rigid linear progression of training. In addition, conventional online learning systems lack contextual data that can inform employees about unique customer perspectives, specific customer environments, and actual customer problems.

Enterprise organizations using serious games to immerse teams of consultants into problems faced by the organization can create large amounts of information regarding problems faced including interviews, narratives, ideas for solving problems, evidence of failed solutions, evidence of successful solutions, etc. In many circumstances, the information generated is the product of experienced consultants or employees. Information used within the serious game can offer rich contextual data providing a deeper level of understanding about the enterprise organization's environment, circumstances, and situations. However, in arriving at solutions to complex problems, large amounts of data can be generated which later in the game becomes clear was irrelevant to a solution.

The above-described deficiencies of training new consultants or employees to address complex problems of customers are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various, non-limiting embodiments, an advisory services network is provided that enables enterprise organizations to identify complex business problems from apparent business problems, immerse a diverse group of people in the businesses of the enterprise organizations, and promote collaboration to develop viable solutions to the complex business problems. An enterprise organization can supply a collection of data to enable members of the diverse group of people to immerse themselves into the problem space, participate in creative discussions, and brainstorm potential solutions. The advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization, for which solutions are currently unknown, and develop potential solutions to those real problems. The gaming platform further enables sharing of ideas among players, discussions among players, and other player interactions to facilitate compounding of perspectives and solutions among a diverse group.

In yet another embodiment, a interactive learning system is provided within the environment supported by the gaming platform. The learning system, in one aspect, allows a player to review evidence items associated with a problem statement existing within the gaming platform. For instance, a player can evaluate the relevance for each evidence item reviewed in addressing the problem statement. The interactive learning system can then automatically generate a solution tailored to the player's evaluations or alternatively allow the player to select or create their own solution. The interactive learning system enables to the player to generate expected performance data related to the solution or actual performance data after the player implements the solution. Performance data can then be incorporated into a new evidence item. The new evidence item can then be shared with other players and/or experts participating in the interactive learning system for discussion.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
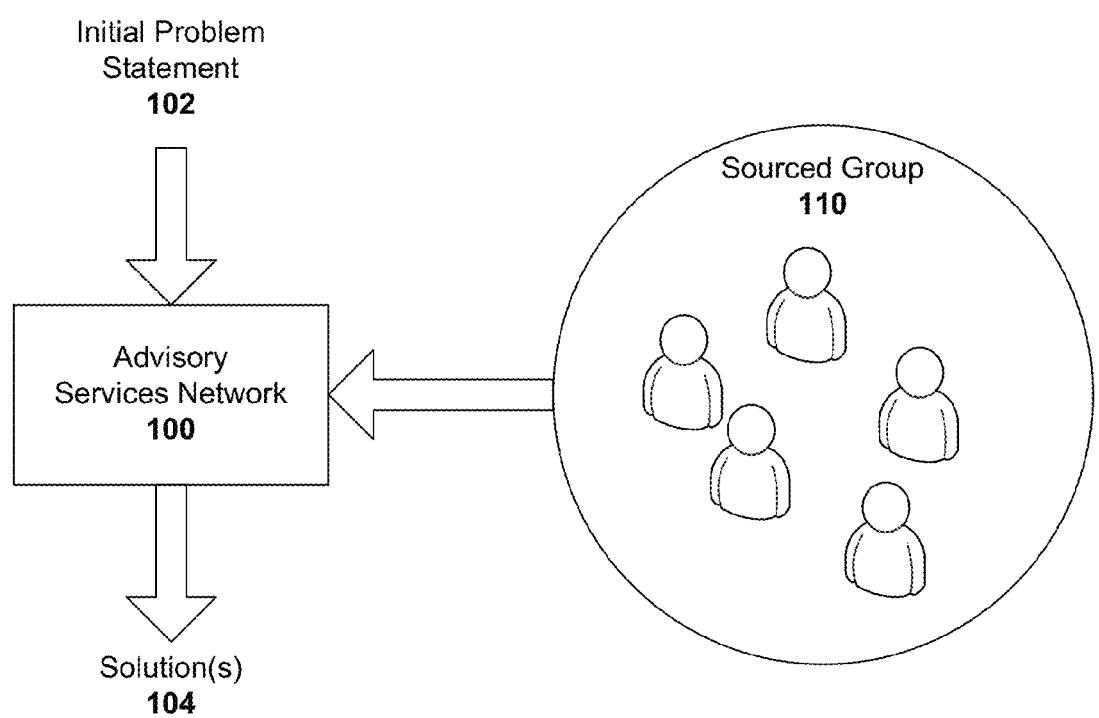
FIG. 1 is a block diagram illustrating an exemplary, non-limiting advisory services network for sourcing a group to develop solutions to complex problems.

As discussed in the background, conventional methods of training consultants or employees online generally follow a rigid structure that lacks contextual data to give those consultants or employees perspective when undergoing training. However, enterprise organizations utilizing serious games to address complex problems can generate large amounts of contextually rich data in playing the serious games. Using the advisory services network game as a learning system, employees can immerse themselves into their customers' issues through reviewing, for example, first hand interviews, videos, and documents, stored as evidence within the game. Employees can learn by vicarious experience through past problems and solutions. Narratives can convey context-data while the context helps to create a new perspective for the employees. Thus, employees can experience a deeper level of understanding about their customers, including their customer's environment, circumstances, and situations, through the rich contextual data. Employees can then engage with customers more easily after learning, through the game, the different types of jobs, personas, practices, procedures, and technologies that their customers utilize. This institutional knowledge allows employees may help employees to more fully address complex issues faced by the customer in the future.

By providing employees with contextual data through the advisory services network game, employees are able to think more clearly about the customer's complex issues and can later troubleshoot problematic areas more efficiently. Having a knowledge base of the contextual data can improve mental reflection, theory formation, and creative innovation. In various embodiments disclosed herein, employees can uncover improved solutions upfront without having to review irrelevant data. By highlighting evidence items identified as relevant to the innovation process, employees can quickly learn and understand actual issues previously faced by a customer and corresponding solutions. These new insights can help to shape and build on their and other peoples' perspectives. Additionally, the systems and methods provide an asynchronous learning environment where players can review insights, form solutions, and otherwise engage within the network services game on their own schedule.

In various, non-limiting embodiments, an advisory services network is provided that enables enterprise organizations to identify complex business problems from apparent business problems, immerse a diverse group of people in the businesses of the enterprise organizations, and promote collaboration to develop viable solutions to the complex business problems. An enterprise organization can supply case studies of real-life scenarios, data, ethnographic interviews to convey multiple views of problematic areas, etc., to enable members of the diverse group of people to immerse themselves into the problem space, participate in creative discussions, and brainstorm potential solutions. In addition to immersion, the advisory services network can improve solution building processes through identification of subject matter experts. The subject matter experts, drawn from the diverse group of players interacting in the advisory services network, can collaborate, co-innovate, and problem solve in a virtual team environment fostered by the advisory services network.

According to a further embodiment, the advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization and develop potential solutions to those real problems. The gaming platform further enables sharing of ideas among players, discussions among players, and other player interactions to facilitate compounding of perspectives and solutions among a diverse group.

In yet another embodiment, an interactive learning subsystem of a network gaming platform is described herein that includes a learning setup component configured to allow a player to select at least one problem statement, retrieve evidence items associated with the at least one problem statement, and provide the evidence items associated with the at least one problem statement for review by a player. In an example, evidence items can be quotes, interviews, videos, documents, discussion board posts, etc. The interactive learning subsystem can also include an evidence evaluation component configured to query a player regarding the plurality of evidence items associated with a problem statement and generate evidence evaluation data based on the query. In an example, some items of evidence may be more relevant than others in arriving at a solution concept. In another example, evidence items that are irrelevant to arriving at a solution may be excluded from review by a player so as to focus player review on more relevant evidence items.

In still further embodiments presented in more detail below, inflection points can be identified to identify the most relevant evidence items in arriving at a solution. In this regard, solution concepts which incorporate the most highly relevant evidence items can be provided to a player of the game reducing the amount of irrelevant evidence items the player would need to review to understand the solution. Further, in various embodiments, a player can construct their own solution concept incorporating evidence items the player deems most relevant to solving the problem. In this regard, player created solution concepts can be shared with other players using the interactive learning system provoking discussion and reflection regarding solution concepts. In yet other embodiments, players can implement solution concepts and return to offer feedback on the implementation which feedback can be incorporated into a new evidence item associated with the problem statement and/or solution concept.

Other embodiments and various non-limiting examples, scenarios and implementations are described in more detail below. As a roadmap for what follows next, an overview of exemplary, non-limiting embodiments and features of an advisory services network and/or an advisory services network gaming platform are described in more detail. Then, various exemplary, non-limiting embodiments and features for an interactive learning subsystem within the gaming platform are described. Finally, some non-limiting implementations and examples are given for additional illustration, followed by representative network and computing environments in which such embodiments and/or features can be implemented.

Overview of an Advisory Services Network and Gaming Platform

As mentioned above, in various embodiments, an advisory services network enables consulting services to be rendered to enterprise organizations facing complex problems. The advisory service network, unlike conventional consulting business models, does not rely on a handful of senior consultants maintaining customer relationships while junior consultants handle problem solving. The advisory services network provides immersion mechanisms through utilization of ethnography, capitalizes on a crowd sourcing to a diverse group and engages identified experts in a talent marketplace to develop quality solutions to enterprise organizations.

The advisory services network implements several primary aspects. First, the advisory services network facilitates transforming the problem. Transforming the problem includes methodology to immerse experts in real-life case studies to identify with complex problems faced by enterprise organizations. For instance, transforming the problem can involve the use of ethnography (e.g., real-life interviews and observations) to obtain perspective on a culture, problems, and experiences of an enterprise organization. In addition, transforming the problem can involve various immersion tactics to place the consultants within the advisory services network in the place of the enterprise organization, e.g., walk in their shoes. Further, transforming the problem can include querying a crowd to expose or uncover a core problem or identify other problems. The advisory services network can also facilitate crowd sourcing a solution, including methodology to utilize a large diverse group of individuals to solve complex problems. Finally, the advisory services network can implement a talent marketplace with methodology to leverage solution concepts and transform solution concepts into collaborative solutions.

In a specific, non-limiting embodiment, the advisory services network can be implemented as a gaming platform to coordinate transforming the problem, crowd sourcing problem solving, and engaging experienced talent to develop real world solutions. A serious game, e.g., a game with a primary objective to be fun and educational, can be developed on the gaming platform. The game can be based around one or more complex problems plaguing an enterprise organization. In particular, the developed game can include a back story, a plurality of narratives, and evidence (e.g., videos, graphics, documents, data, etc.).

The game immerses players (e.g., members of a diverse source group of the advisory services network) into the problem space of the enterprise organization. The game challenges players to identify real problems from apparent problems and develop possible solution to the real problems. The game encourages players to share ideas with other players who can provide fresh perspectives and additional input based upon their own, individual findings. As the game pushes more and more players to offer viewpoints and solution concepts, the game provides mechanisms to enable players to interact, exchange ideas, and discuss ideas. In this manner, the players can modify their own ideas based upon the viewpoints of other players, collaborate together on solutions, and otherwise uncover high quality and robust solutions via perspective compounding.

With respect to one or more non-limiting aspects of the advisory services network as described above, FIG. 1 shows a block diagram illustrating an exemplary, non-limiting embodiment for sourcing a group to develop solutions to complex problems. As shown in FIG. 1, an advisory services network 100 can receive an initial problem statement 102. In an example, an enterprise organization, a business, a governmental organization, or other similar entity experiencing a complex problem can supply initial problem statement 102, which attempts to portray the complex problem. Advisory services network 100 draws upon sourced group 110 to generate and develop one or more solutions 104, which potentially solve the complex problem of the organization supplying initial problem statement 102.

Sourced group 110 can include diverse group of experts, consultants, and other people. Diversity with sourced group 110 can exist in a variety of ways. For instance, members of sourced group 110 can exhibit diversity in terms of geography, culture, ethnicity, age, education, career, skills, background, experience, etc. Sourced group 110 can be built to achieve, intentionally, diversity in one or more characteristics. It is also to be appreciated that, as sourced group 110 grows in size, diversity in a variety of aspects inevitably occurs.

Figure 2:
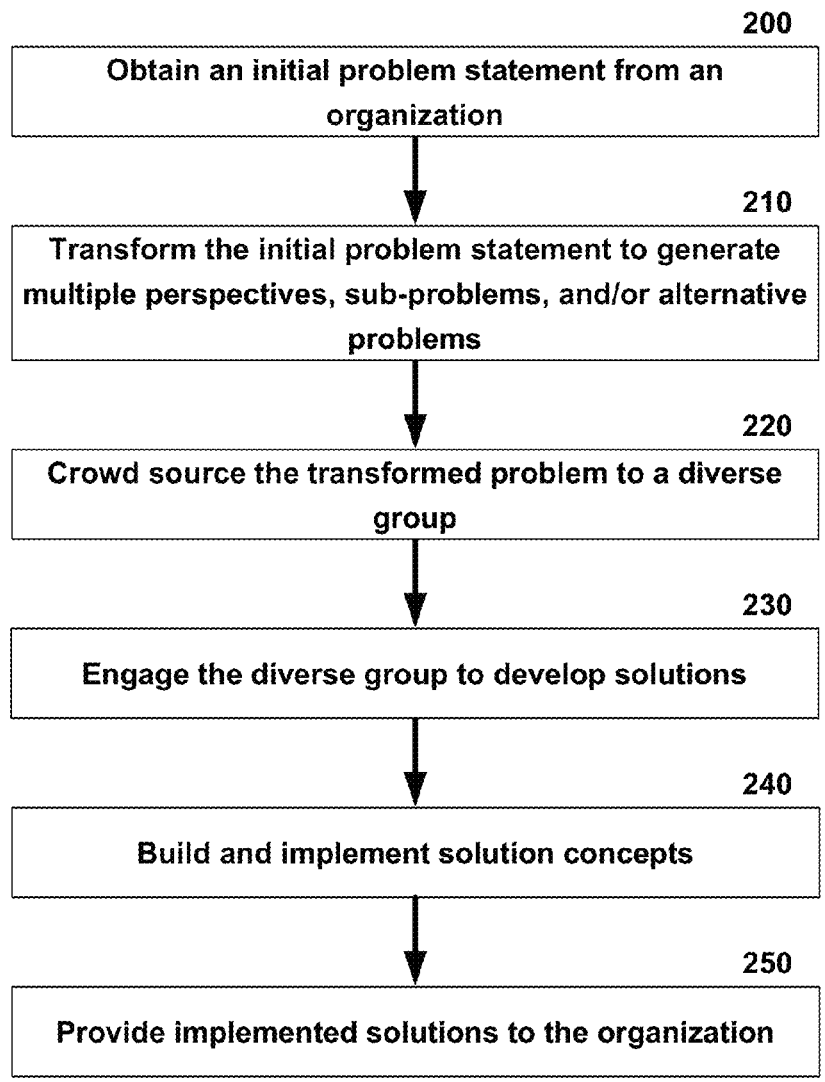
FIG. 2 is a flow diagram illustrating an exemplary, non-limiting embodiment for developing solutions to complex business problems via crowd sourcing.

FIG. 2 depicts a flow diagram illustrating an exemplary, non-limiting embodiment for developing solutions to complex business problems via crowd sourcing. The embodiment shown in FIG. 2 can be utilized by advisory services network 100 of FIG. 1 to leverage sourced group 110 to develop solutions 104 based upon initial problem statement 102. At 200, an initial problem statement is obtained from an organization. The initial problem statement can convey an apparent problem faced by the organization. According to a non-limiting example, the apparent problem can be related to dataflow and information sharing limitations, capturing and transmitting real-time data, securing the right resources and equipment, brainstorming future innovations, etc.

At 210, the initial problem statement is transformed to generate multiple perspectives, sub-problems, and/or alternative problems. The problem can be transformed by a diverse group of participants in the advisory services network through direct observations, ethnographic interviews, support documents, etc., which capture various viewpoints of the initial problem statement from employees and associates of the organization. Participants in the advisory services network can build dossiers to provide multiple perspectives or views of the problems faced by the organization, to articulate root problems of the organization, and/or to present focused opportunities for the organization in the future. During this phase, the participants immerse themselves in the problem space, review qualitative and quantitative data, and provide a wide variety of insights and perspectives as a result.

At 220, the transformed problem is crowd sourced to a diverse group. Crowd sourcing is a model that leverages collective insights and experience of the diverse group to produce quality results. At 230, the diverse group is engaged to develop solutions. In a specific, non-limiting example, a rewards-based model can be employed to entice members of the diverse group to participate and develop solution concepts. For instance, as described in greater detail below, members of the diverse group can earn points for participation. At 240, solution concepts are built and implemented. For example, in the previous phases, subject matter experts can be identified in the diverse group. Virtual teams can be constructed around these subject matter experts. The virtual teams can collaborate to translate solution concepts, submitted by the diverse group sourced by the advisory service network, into solution designs and architectures. The organization can select one or more solution designs and architectures for implementation and deployment. At 180, implemented solutions are provided to the organization for deployment.

Figure 3:
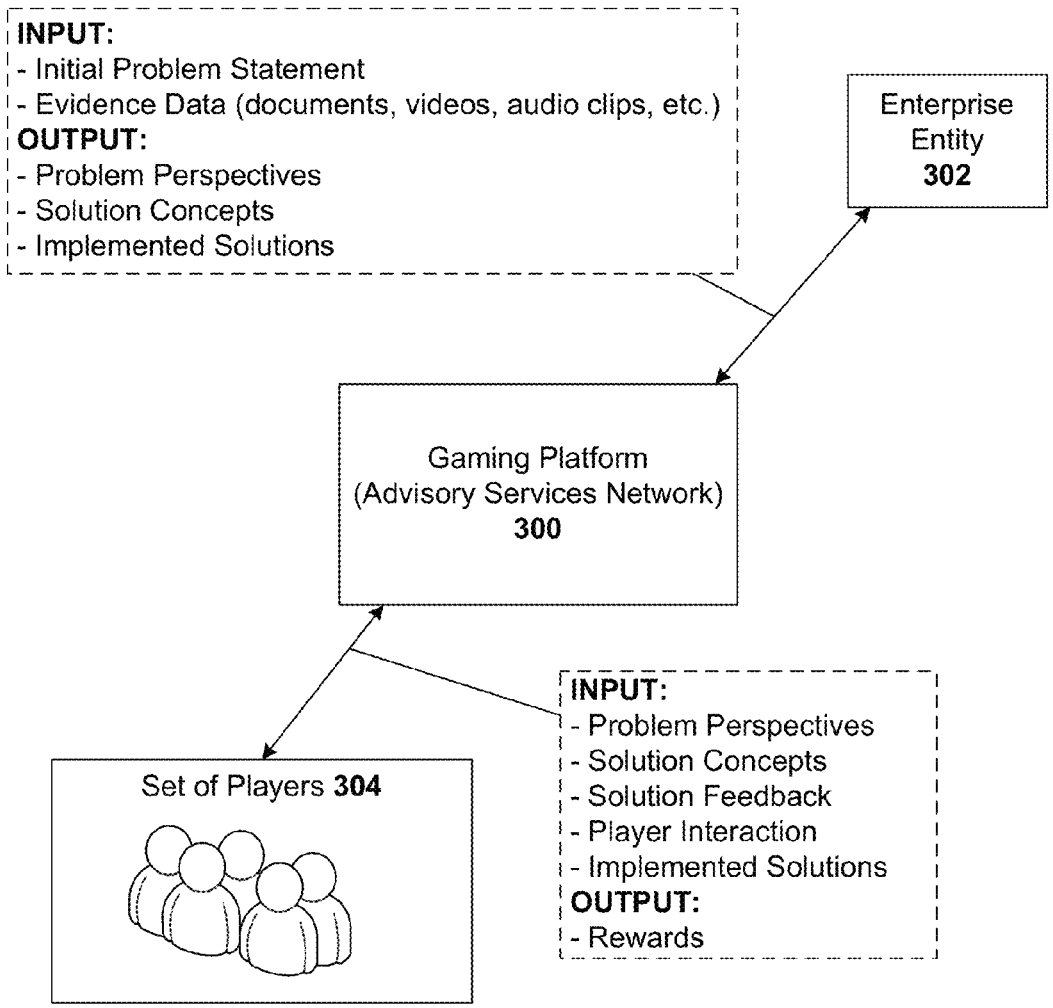
FIG. 3 is a block diagram illustrating an exemplary, non-limiting embodiment of an advisory services network implemented as a gaming platform.

Turning to FIG. 3, a block diagram is shown illustrating an exemplary, non-limiting embodiment for a gaming environment which immerses players in problems faced by an organization. As shown in FIG. 3, a gaming platform 300, implementing the advisory services network, on which a serious game can be designed, implemented, and deployed. The serious game, as mentioned above in the Overview, can provide an entertaining and thought provoking environment in which at least a portion of the process described with respect to FIG. 2 can occur. For instance, the serious game can be designed to facilitate solving real-world complex business problems and challenges faced by an organization, such as enterprise entity 302. The serious game of gaming platform 300 is configured to immerse a set of players 304 into the business of enterprise entity 302, to engage and reward the set of players 304 for solution building, and to promote interaction, collaboration, and discussion among the set of players 304.

As illustrated in FIG. 3, gaming platform 300 obtains various inputs from enterprise entity 302 and/or the set of players 304. In addition, gaming platform 300 provides various outputs to enterprise entity 302 and the set of players 304. For instance, enterprise entity 302 can supply gaming platform 300 with an initial problem statement specifying an apparent problem and evidence such as videos, audio clips, documents, etc., which further detail the apparent problem. The gaming platform 300 employs the initial problem statement and evidence to establish a setting (e.g., introduction and narrative game content) of the serious game corresponding to the complex problems suffered by enterprise entity 302. The setting provides a story in which the evidence fits while also supporting the evidence.

The set of players 304, via the established setting, carry out the steps of the advisory services network process described in FIG. 2. For instance, the set of players 304 can provide input to the game in the form of problem perspectives (e.g., description of each player's view of the problems of enterprise entity 302), solution concepts, feedback on solution concepts of other players, interactions and discussions among players, implemented solutions, and the like. Through gaming platform 300, enterprise entity 302 is presented with the problem perspectives, solution concepts, and implemented solutions developed by the set of players 304. In return, the set of players 304 achieve rewards (e.g., points). It is to be appreciated that the inputs and outputs illustrated in FIG. 3 are several examples to facilitate understanding of the gaming platform 300 and are a non-exhaustive listing of the inputs and outputs which can expressed in the gaming platform 300.

Figure 4:
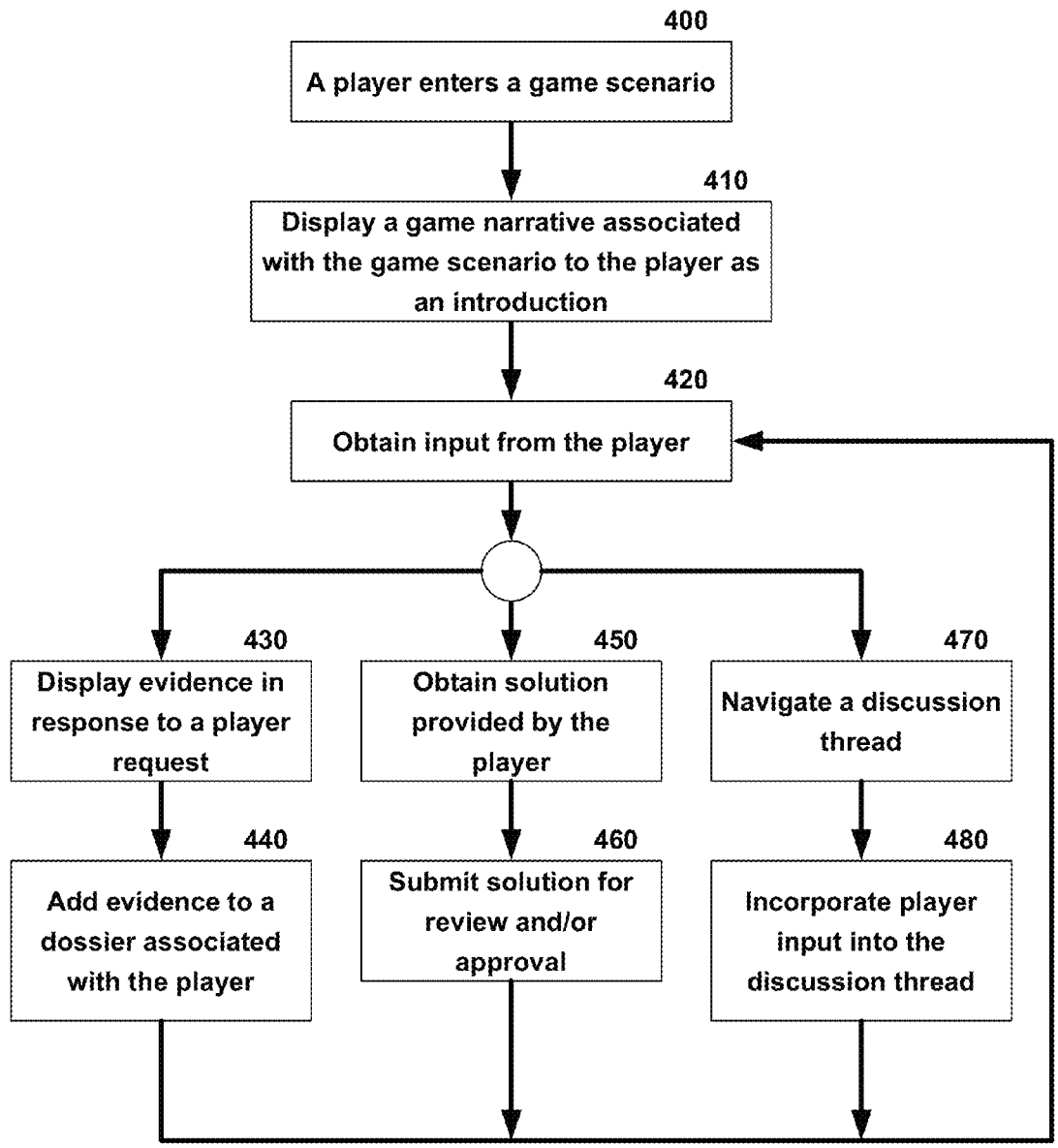
FIG. 4 is a flow diagram illustrating an exemplary, non-limiting embodiment for a gaming environment which immerses players in a business of an enterprise organization facing a complex business problem.

FIG. 4 shows a flow diagram illustrating an exemplary, non-limiting embodiment for a gaming environment which immerses players in a business of an enterprise organization facing a complex business problem. The embodiment depicted in FIG. 4 is one example of a workflow followed by the set of players 304 of a serious game of gaming platform 300 from FIG. 3. At 400, a player enters a game scenario. At 410, a game narrative association with the game scenario is displayed to the player as an introduction. The narrative, according to an exemplary embodiment, can include a plurality of scenes each portraying a portion of a larger story specifying a complex problem. After reading through the game narrative, the player can begin interacting with the game. Accordingly, at 420, input is obtained from the player. The input provided by the player can take several forms or indicate one of several actions desired by the player. In one example, the input can be a selection of an item of evidence associated with a particular scene of the narrative. In response to this input, at 430, the selected item of evidence is displayed to the player. At 440, the selected item of evidence is added to a dossier associated with the player.

In another example, the input can be a solution or a solution concept developed by the player. At 450, the solution or solution concept, provided by the player, is obtained. At 460, the solution or solution concept is submitted for review and/or approval by, for example, an organization whose complex problem is modeled within the game. In yet another example, the input can be navigational input to transition the user to a discussion thread hosted within the game. At 470, in response to navigational input obtained from the player, the discussion thread can be retrieved and displayed. The player can read, respond, collaborate, or otherwise participate in the discussion thread. At 480, player input (e.g., posts, etc.) can be incorporated into the discussion thread.

While FIG. 4 depicts individual input handling paths, it is to be appreciated that such depiction is a simplification to provide a high level overview of potential actions, scenarios, and responses within a game instance of advisory services network gaming platform. For instance, while viewing an item of evidence at 430, the player can provide input for which a game response is to navigate to discussion thread, at 470, associated with or related to the item of evidence. Accordingly, the player is not limited to merely adding the item of evidence to the dossier as a multitude of actions can be taken upon viewing the item of evidence. In another example, submitting a solution, at 460, can start a discussion thread which is navigated to at 470. The game can continue to loop as shown in FIG. 4, wherein the player continues to navigate the narrative, provide input, participate in discussions, etc., until the player exits the game and/or a ending point within the game is reached.

Figure 5:
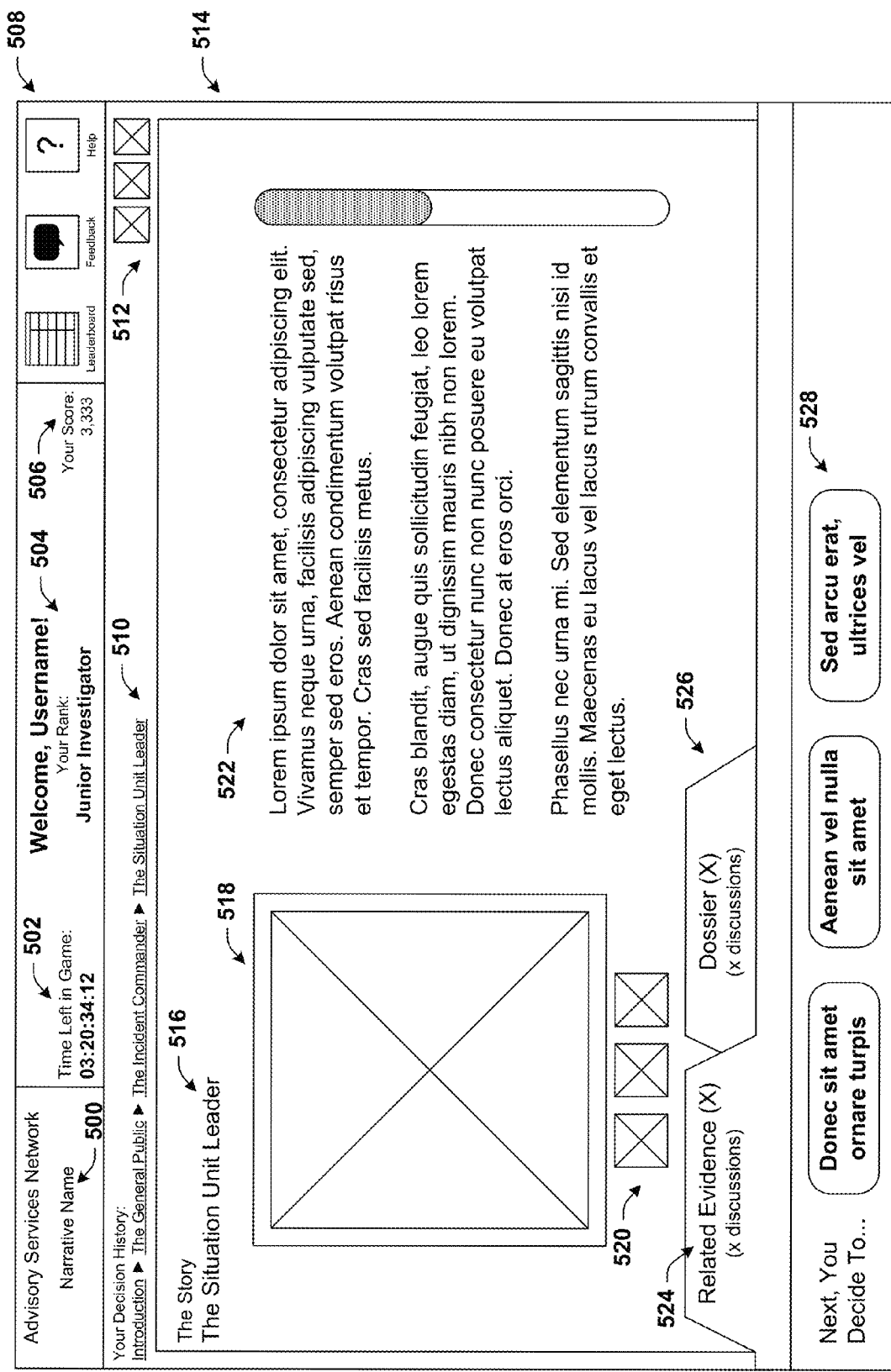
FIG. 5 is an exemplary, non-limiting illustration of a user interface of a gaming environment of an advisory services network.

Referring to FIG. 5, an exemplary, non-limiting illustration of a user interface of a gaming environment of an advisory services network. The user interface can be deployed on a standalone application executing on an operating system of a computer or as web-based application executing on a web server and accessed via a web browser. As shown in FIG. 5, the user interface can include a wide array of sections presenting a variety of information. At 500, a logo or name of the system (e.g., "Advisory Services Network") can be displayed along with a name of specific game instance or narrative. In a specific, non-limiting example, the narrative name can be a name or identity of an organization whose complex problem is modeled by the game instance. In another example, the narrative name can be more descriptive and hint or suggest the complex problem of the organization.

At 502, an indication of time remaining in the game can be displayed. The organization with the complex problem can have a time limit by which it would desire a potential solution to be presented. Such time limit can translate into time duration of the game as shown at 502. At 504, a header portion with header information can be presented. In FIG. 5, header information, in a specific, non-limiting example, can include a greeting and a rank provided to the player in the game. At 506, the player's score can be shown. The score can be utilized to indicate a significance of a player's contribution in the game and/or to serve as a basis to distribute intrinsic and extrinsic rewards to the player.

At 508, various game support functions can be presented as a series of buttons. For instance, support functions, when selected, can open up modal displays with appropriate controls. As shown in FIG. 5, some exemplary support functions include a leaderboard function, a feedback function, and a help function. At 510, navigational breadcrumbs are depicted. The navigational breadcrumbs serve a dual purpose. Not only do the navigational breadcrumbs indicate a current scene viewed by the player, but the navigational breadcrumbs also depict the choices or path taken by the player to arrive at the current scene. At 512, a list of other players who have played through the current scene. As shown in FIG. 5, and in accordance with one exemplary, non-limiting embodiment, the list of players can be depicted as a series of thumbnail images of avatars or other identifiers associated with the players. This information can enable a player to research other choices, actions, or input from other players regarding the current scene and evidence.

In FIG. 5, numeral 514 indicates a main content portion of the user interface. Within the main content portion, a scene title (516) can be displayed along with any imagery related to the scene, shown as a primary image at 518 with alternative thumbnail images at 520. Further, a scene narrative, shown at 522, can be presented along with a scrollbar if the narrative extends beyond a viewable pane of the user interface.

At 524, a related evidence tab is displayed, which can be activated to display a list of evidence supporting the current scene. The tab label, as shown in FIG. 5, can provide an indication of a number of evidence items as well as an indication of a number of discussion threads related to the evidence items. At 526, a dossier tab is depicted which enables access to the player's dossier. The tab label of the dossier tab indicates a number of items included in the player's dossier as well as a number of discussions pertaining to the player's dossier. At 528, a series of navigational options are provided to the player. The navigational options present scenes to which the player can navigate to from the current scene.

Figure 6:
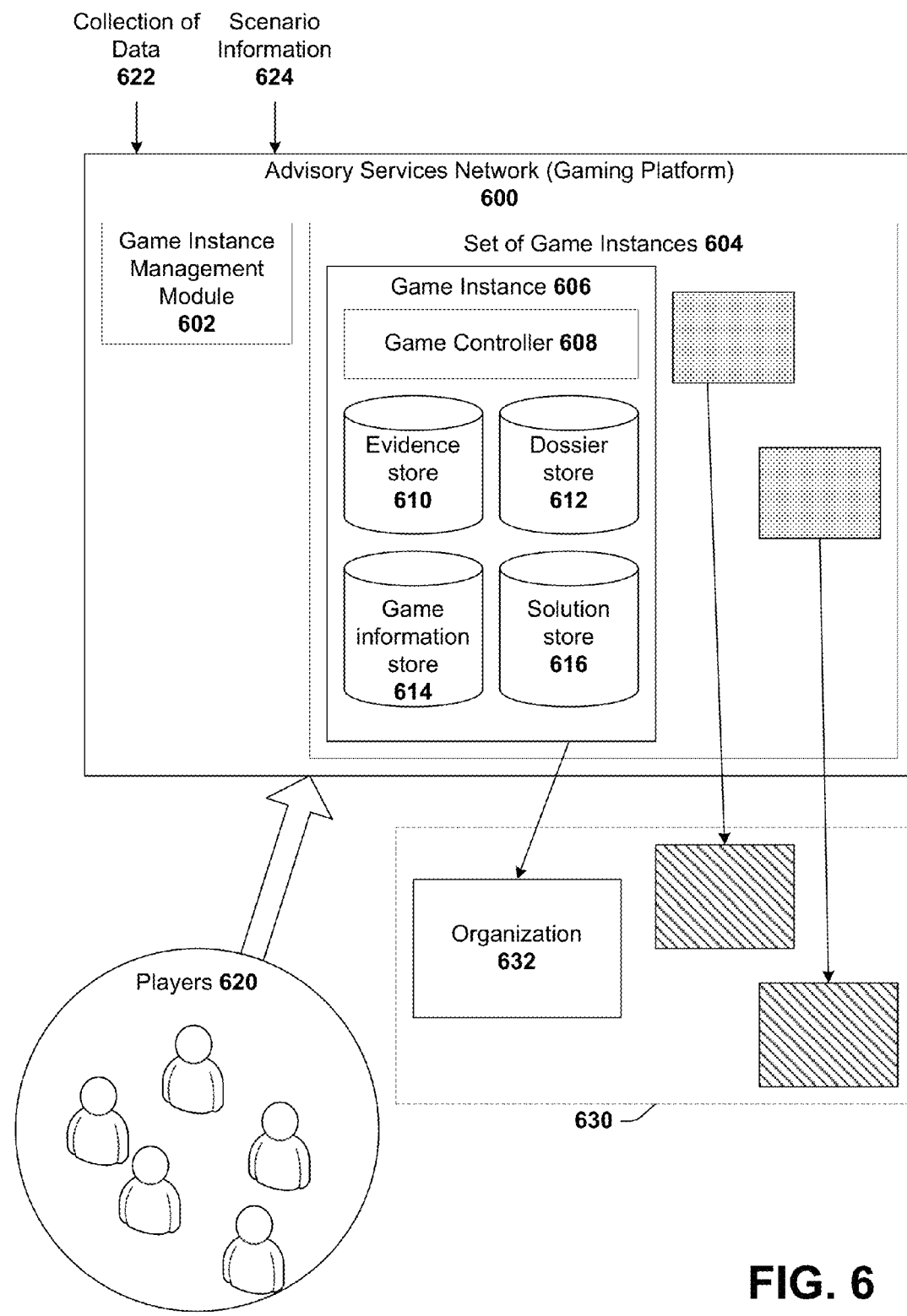
FIG. 6 is a block diagram of an exemplary, non-limiting embodiment of advisory services network hosting a game instance.

Turning to FIG. 6, illustrated is a block diagram of an exemplary, non-limiting embodiment of advisory services network 600 or gaming platform configured to host a plurality of serious game instances. As shown in FIG. 6, the advisory services network 600 hosts a set of game instances 604, where each game instance is a playable serious game. While FIG. 6 depicts the set of game instances 604 having three game instances, it is to be appreciated that FIG. 6 is an exemplary embodiment to illustrate one or more aspects of the advisory services network 600 and that the set of game instances 604 hosted by the advisory services network 600 can include up to N game instances, where N is an integer greater than or equal to one.

Advisory services network 600 can include a game instance management module 602 configured to administer the set of game instances 604. According to a specific, non-limiting example, the game instance management module 602 can instantiate new game instances. The game instance management module 602 can generate a new game instance from received information provided by a sponsor of the new game instance (e.g., an organization with a complex problem)

or developed, by a provider of the advisory services network, based upon information obtained from the sponsor. Specifically, game instance management module 602 creates game instance 606 based upon a collection of data 622 and scenario information 624 provided to the advisory services network 600. The collection of data 622 can include various items of evidence, e.g., photos, videos, audio clips, documents, etc., which support or explain aspects of a complex problem providing the setting of game instance 606. Scenario information 624 can include a series of narratives divided into scenes which organize the collection of data 622 in a meaningful manner to provide a player with a fun and thought-provoking journey through the complex problem of game instance 606. Scenario information 624 can be created so as to the immerse players 620 in the world of the sponsor of game instance 606 while playing the game.

Game instance management module 602 instantiates game instance 606 and populates various data stores therein with data based upon the collection of data 622 and the scenario information 624. For example, when creating game instance 606, game instance management module 602 can store the collection of data 622 into an evidence store 610. In addition, game instance management module 602 can save scenario information 624 into a game information store 614. Further, game instance management module 602 configures a game controller 608, which maintains a user interface for players 620, handles input from players 620, progresses game play in accordance with game information stored in the game information store 614, manages access and storage of data to the various data stores of game instance 606, and performs a variety of other functions. As players 620 engage the serious game provided by game instance 606, game controller 608 appropriate responses. As described above, players 620 can navigate through scenes and narratives, view supporting evidence, and select items of evidence to be added to dossiers respectively associated with the players 620. Game controller 608 receives navigation input from players 620, retrieves requested scene information from game information store 614, and generates a corresponding user interface presented to players 620. Moreover, game controller 608 can receive the evidence selection and update dossier information in a dossier store 612 appropriately.

As described above, an aspect of serious games provided by advisory services network 600 is the ability of players 620 to suggest, develop, collaborate, etc. on solutions to the complex problem of the sponsor. As players 620 generate solutions and/or solution concepts, game controller 608 retains the solutions and solution concepts in a solution store 616. While FIG. 6 depicts the various data stores as distinct elements, it is appreciated that such separation is a functional separation intended to facilitate comprehension of one or more features of serious games hosted by the advisory services network 600. It is to be appreciated that single data store, with or without partitions, can be employed to store various game, evidentiary, and player-generated information.

As shown in FIG. 6, each game instance in the set of game instances 604 can be associated with a sponsor, such as an organization with a complex problem, from a set of organizations 630. In a specific, non-limiting example, game instance 606 corresponds to organization 632. Accordingly, the collection of data 622 and scenario information 624 employed to generate game instance 606 can originate from organization 632 and can relate to a complex business problem of organization 632. While FIG. 6 shows game instances in the set of game instances 604 individually and respectively associated with distinct organizations in the set of organizations 630, it is to be appreciated that a single organization can sponsor multiple game instances corresponding to multiple complex business problems, or multiple organizations can sponsor a single game instance related to a shared complex problem.

The aforementioned embodiments of an advisory service network and associated gaming platform are intended to provide a general overview of a potential environment in which to implement and deploy the embodiments and features of a interactive learning system described below.

Interactive Learning System within the Advisory Services Network

As mentioned above, an interactive learning subsystem of the advisory services network is disclosed herein in which a player can utilize rich contextual data within the advisory services network in an immersive training experience.

Figure 7:
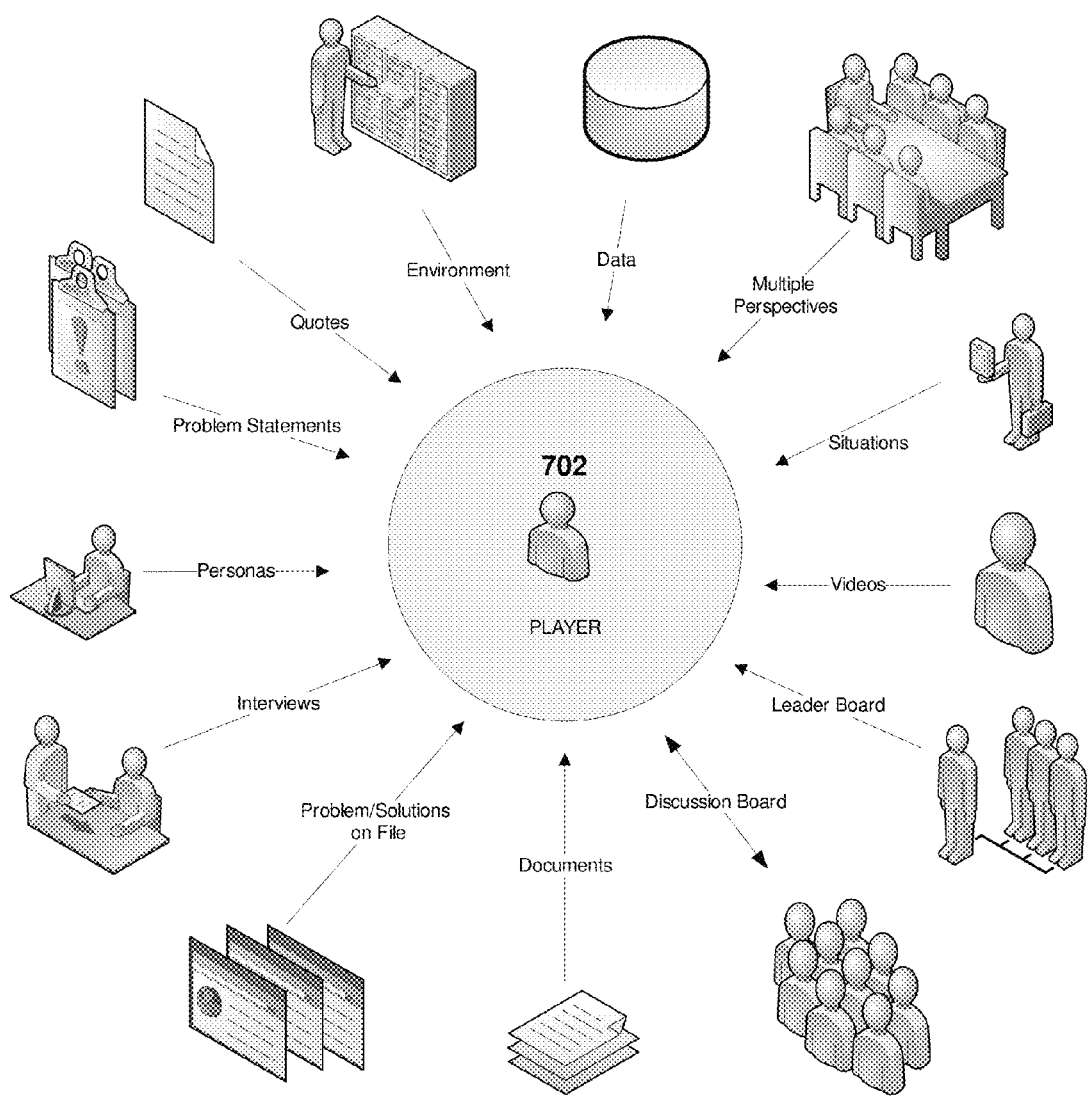
FIG. 7 is a graphical diagram illustrating exemplary, non-limiting examples of evidence items reviewable by a player using the interactive learning system.

FIG. 7 is a graphical diagram illustrating exemplary, non-limiting examples of evidence items reviewable by a player using the interactive learning system. A player 702 can access as evidence items, for example, documents, problem/solutions on file, interviews, personas, problem statements, quotes, environments, data, multiple perspectives, situations, videos, leader boards, discussion board posts, etc. It can be appreciated that conceivably any type of data created within the game can be an evidence item.

It can be further appreciated that a variety of types of evidence can provide player 702 with context-data created by others sharing their unique perspectives. For example, discussion board posts regarding a set of data can convey the post author's unique perspective on how they interpret the set of data. Thus, a player 702 can engage with other players of the game asynchronously without constraints like timing or location.

Figure 8:
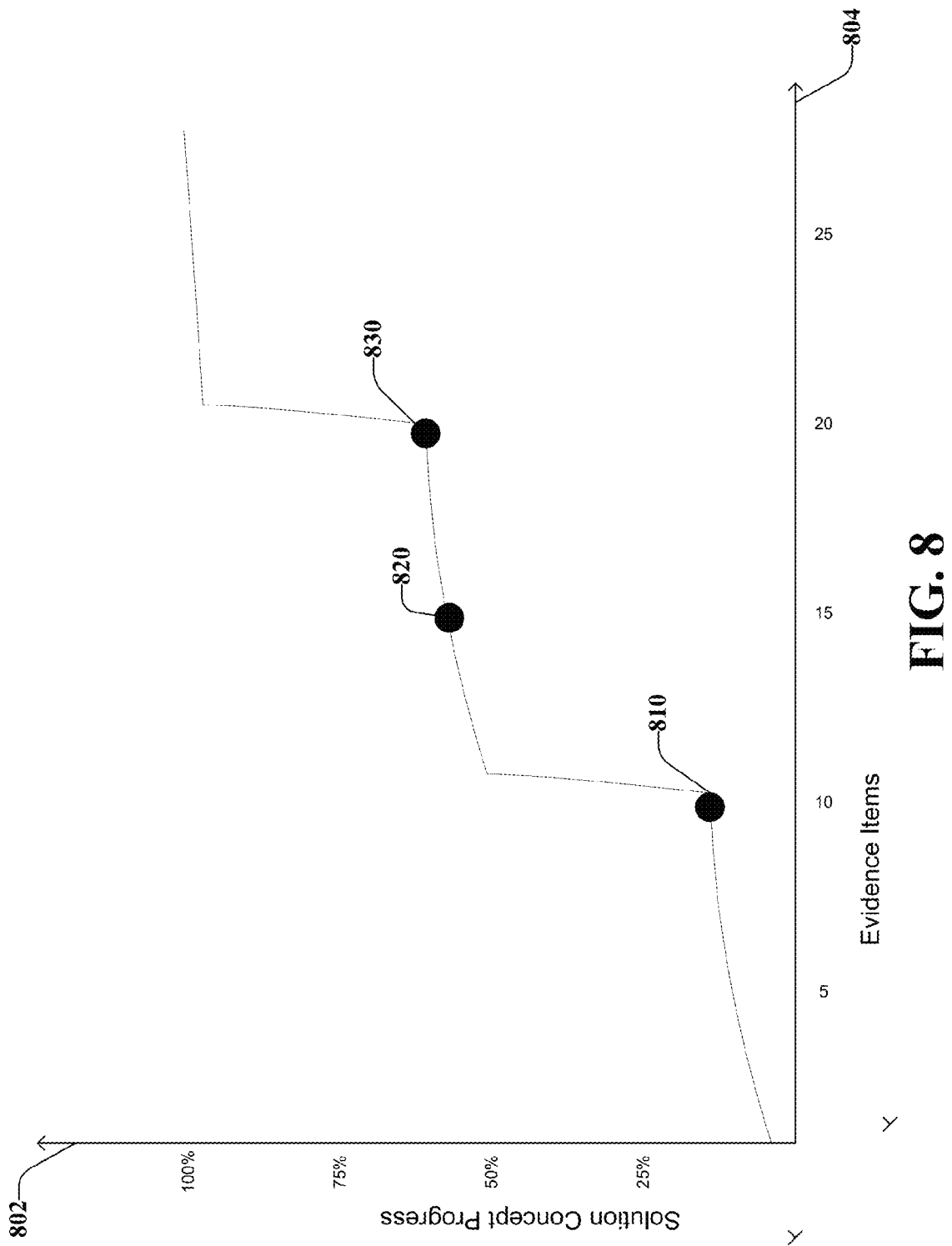
FIG. 8 is a graphical diagram illustrating an exemplary, non-limiting example of inflection points relating to evidence items associated with a problem statement.

FIG. 8 is a graphical diagram illustrating an exemplary, non-limiting example of inflection points relating to evidence items associated with a problem statement. A vertical axis 802 represents progress towards a solution concept. A horizontal axis 804 represents a progression of evidence items. It can be appreciated that in this example each evidence items is associated with a common problem statement. For example, in arriving a solution, it is likely that each progressing evidence item associated with the problem statement was not equally relevant in leading to an eventual solution. For example, at 810, evidence item 10 was introduced to the problem statement and solution progress jumped significantly after its introduction. Similarly, at 830, evidence item 20 was introduced to the problem statement and another large jump in solution progress was made. In contrast, at 820, evidence item 15 was introduced which did not produce a large jump in solution progress. Data points 810 and 830 can signify inflection points, where highly relevant evidence items were introduced into the problem space leading to a significant progression towards a solution. It can be appreciated that by players submitting relevancy information relating to evidence items, relative relevancy between differing evidence items can be determined. Those evidence items which are identified as the most relevant, e.g. 810 and 830, are likely inflection points.

In this regard, in various embodiments, existing solution concepts that incorporate the most inflection points can be determined. Evidence items associated with those solutions concepts can then be presented to a player of the game as the most relevant evidence items to consider in learning more about the associated problem statement and identified solution. In other embodiments, a player can create a solution concept encompassing player chosen evidence items the player believes are indicative of inflection points. In this manner, solution concepts can be optimized over time to eliminate irrelevant evidence items from consideration and instead focus on presenting relevant evidence items to players. Such optimization can allow future players to more efficiently understand a problem statement and an associated solution.

Figure 9:
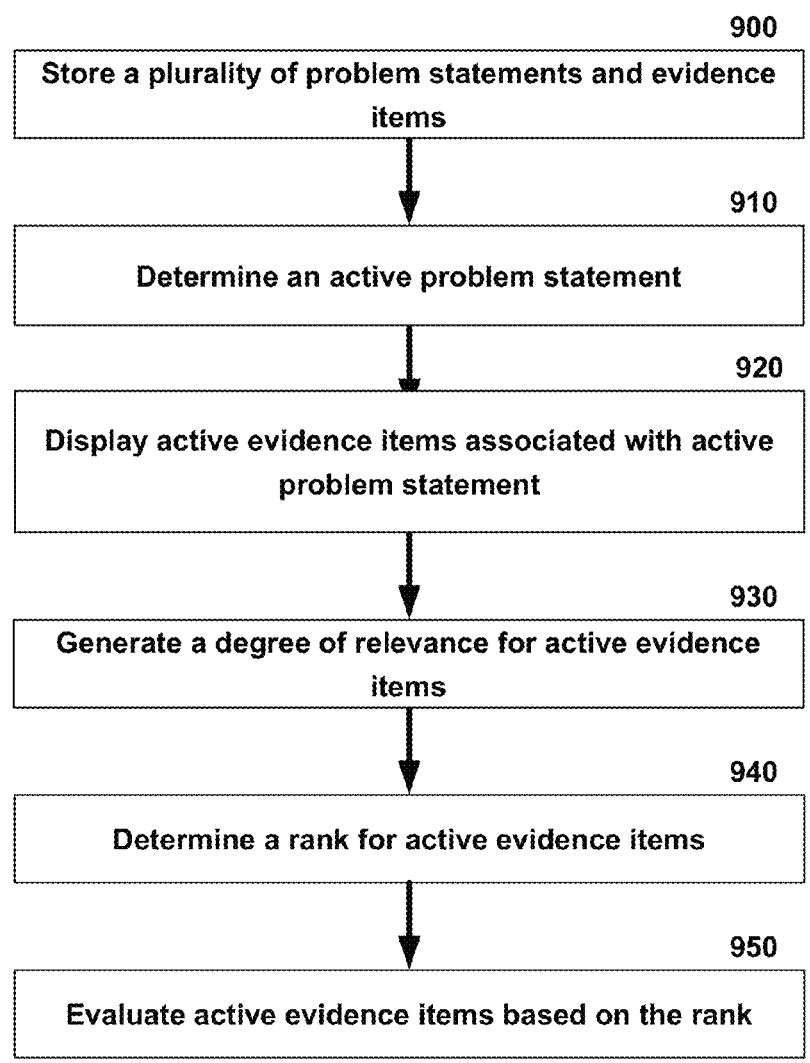
FIG. 9 is a flow diagram of an exemplary, non-limiting embodiment for displaying and reviewing evidence items.

FIG. 9 is a flow diagram of an exemplary, non-limiting embodiment for displaying and reviewing evidence items by a player using the interactive learning method. At 900, a plurality of problem statements, a plurality of solution concepts, and a plurality of evidence items employable in a game by a variety of players are stored wherein evidence items and solution concepts are associated with at least one problem statement. It can be appreciated that the selection of a problem statement will determine which associated evidence items and solution concepts will be presented to a player for review.

It can be further appreciated that evidence items and problem statements can be associated with solution concepts in an alternative embodiment or alternatively solution concepts and problem statements can be associated with evidence items. Association can be accomplished through metadata tagged to the various objects. For example, an evidence item can be tagged with metadata containing any problem statements and/or solution concepts associated with the evidence item. It can be appreciated that problem statements and solution concepts can be similarly tagged with metadata.

At 910, an active problem statement is determined based upon a player selection. For example, a player can access an index of problem statements to which a solution has already been generated. The index can contain a brief description of the problem allowing a player to determine which problem statement he or she wishes to examine in greater detail. An index can organize problem statements based on for example, the customer which created the problem statement. A player, for example, could then focus on a single customer, a group of customers, or a type of problem. Alternatively, an administrator or the like can determine which problem statements are most relevant to interactive learning based on factors such as, for example, employee position, employee hire date, employee customer base, etc.

At 920, a plurality of active evidence items can be displayed to the player wherein the plurality of active evidence items are evidence items associated with the active problem statement. It can be appreciated that not all active evidence need be displayed. As discussed further below, items previously determined to be irrelevant can avoid display at step 920 or alternatively, items known to be relevant can also avoid display at this step. It can be appreciated that a subset of active evidence can be displayed at step 920 for a myriad of reasons including redundancy, lack of rank information, surplus of rank information, number of active evidence items, etc.

At 930, a degree of relevance can be generated for the plurality of active evidence items based upon a player query. For example, a player can be asked to rank on a scale the relevancy of an evidence item. It can be appreciated that the scale used by a player to rank relevancy can be adjusted in a manner that most differentiates different evidence items. In addition, the query can ask players to identify why an evidence item is more or less relevant. In one embodiment, a player can view another player's reasoning for why an evidence item is more or less relevant in assessing the relevancy of the same evidence item.

At 940 a rank can be determined for the plurality of active evidence items based upon the degree of relevance. As stated above in regards to step 920, items can be selected at step 920 for display based on a previous ranking of the item. In one embodiment, a previous ranking and the degree of relevance can be used at step 940 to modify a ranking of the active evidence item. For example, an active evidence item that has been previously ranked many times may place more weight on the previous ranking versus the degree of relevance generated at step 930. Alternatively, an active evidence item that has not been previously ranked may place greater weight on the degree of relevance generated at step 930.

At 950, the plurality of active evidence items can be evaluated based on the rank. For example, the evaluation can determine inflection points as described above with respect to FIG. 8. In one embodiment, the evaluation can determine which active evidence items should likely be present in a solution concept for the problem statement. Further evaluation techniques are discussed below in greater detail with regards to FIG. 10.

Figure 10:
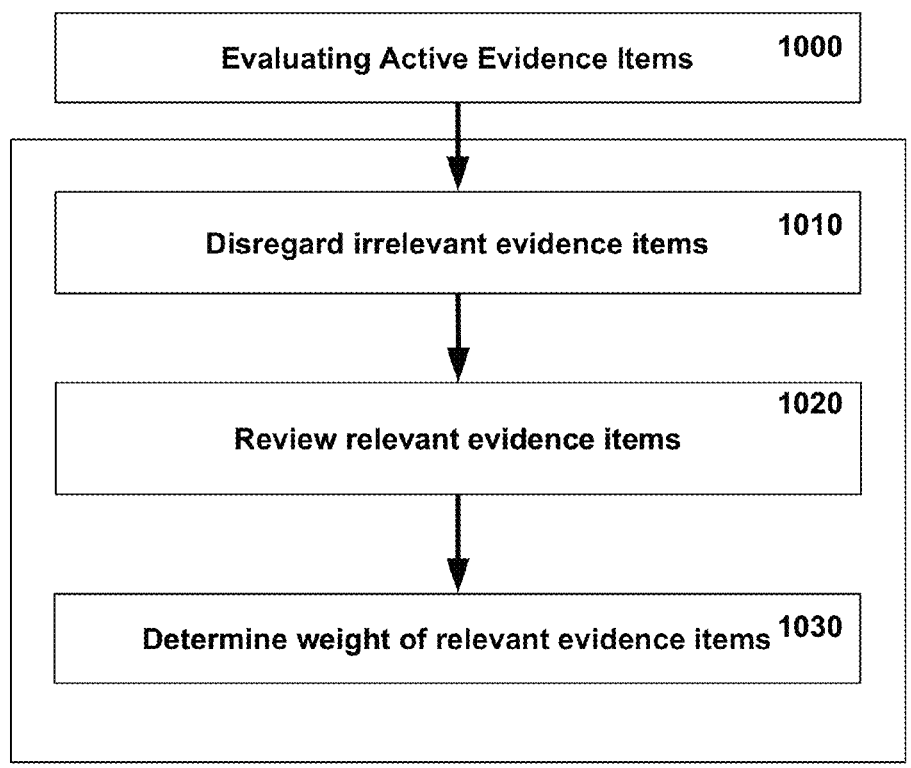
FIG. 10 is a flow diagram of an exemplary, non-limiting embodiment for evaluating evidence items.

FIG. 10 is a flow diagram of an exemplary, non-limiting embodiment for evaluating evidence items. At 1000 active evidence items are evaluated which can include at least one of: disregarding irrelevant evidence items 1010, player review of relevant evidence items 1020, or determining a weight of relevant evidence items 1030. For example, those evidence items determined to be inflection points as discussed in regards to FIGS. 8 and 9 can be weighted more heavily than less relevant evidence items. In another example, items that are determined to be irrelevant towards arriving at a solution concept can be disregarded. In one embodiment, relevant evidence items, irrespective of whether a player submitted a degree of relevance for the evidence item, can be reviewed the player. It can be appreciated that by minimizing the number of evidence items a player reviews, the interactive learning system can more efficiently teach concepts to the player.

Figure 11:
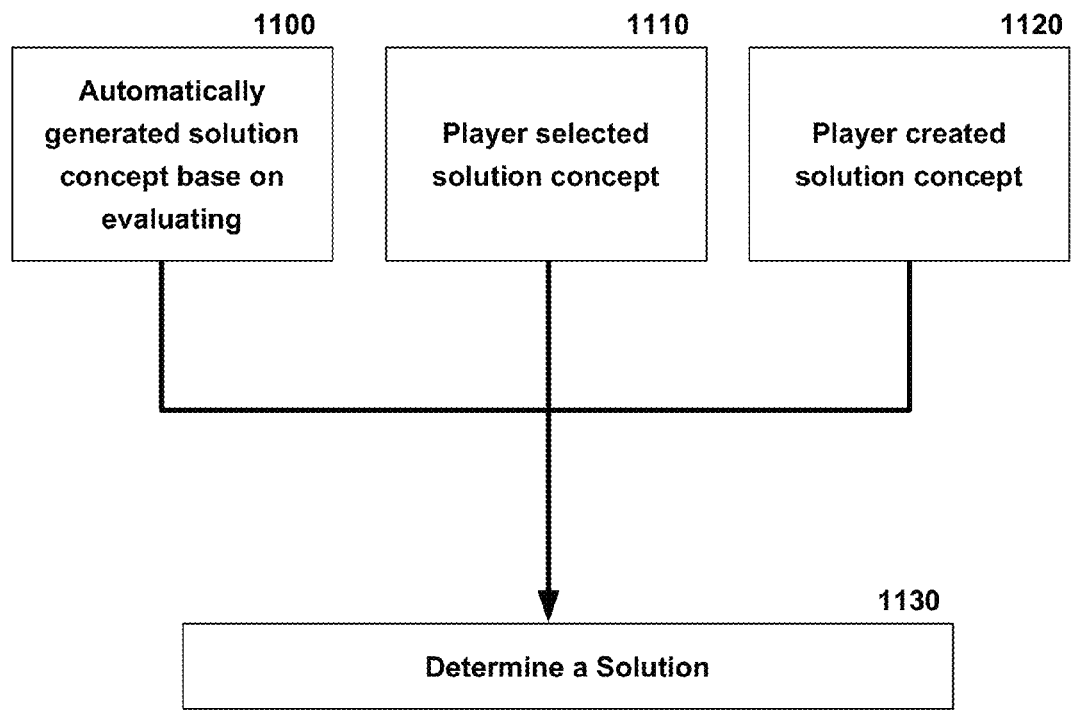
FIG. 11 is a flow diagram of an exemplary, non-limiting embodiment for determining a solution.

FIG. 11 is a flow diagram of an exemplary, non-limiting embodiment for determining a solution by a player of the interactive learning system. An automatically generated solution concept can be created at 1100. For example, an automatically generated solution can be an existing solution concept that is determined uses the most relevant evidence items, uses the most inflection point evidence items, or is the most highly ranked solution concept. It can be appreciated that algorithms can be established to select the most relevant solution concept using evidence items rankings or other available metadata.

At 1110 a player can select a solution concept. For example, a player can review existing solution concepts associated with the problem statement and select the solution concept the player believes is most relevant. At 1120, a player can elect to create their own solution concept incorporating player selected evidence items and/or a player narrative. It can be appreciated multiple solutions can be determined at step 1130 including solutions based on steps 1100, 1110, and 1120.

Figure 12:
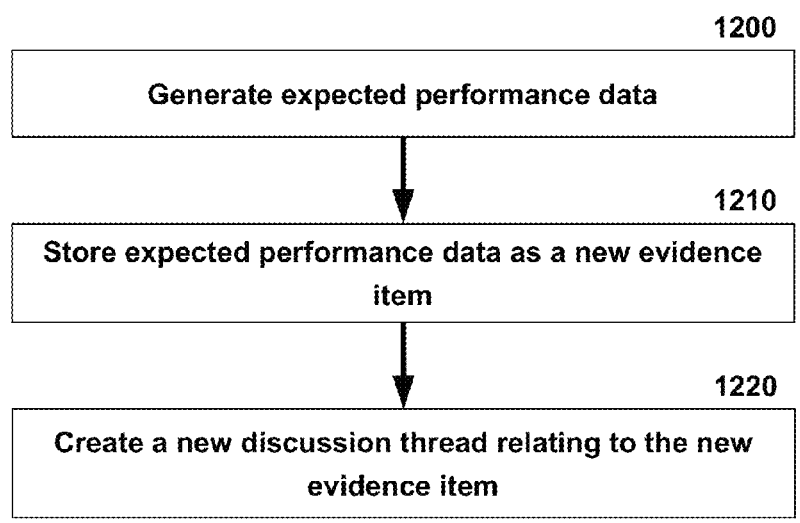
FIG. 12 is a flow diagram of an exemplary, non-limiting embodiment for sharing expected performance data of a solution.

FIG. 12 is a flow diagram of an exemplary, non-limiting embodiment for sharing expected performance data of a solution, where the player has yet to attempt to implement the solution. Thus at 1200, expected performance data can be generated. For example, a player can be queried to submit their perspective regarding the expected performance of a solution. It can be appreciated that the submission could be a video, a narrative, a document, an interview, data, a quote, etc. It can be further appreciated that a type of submission can depend on the type of problem statement that is being posed. At 1210, the expected performance data can be stored as a new evidence item. In one embodiment, the new evidence item can be associated with the problem statement the solution addresses or the solution concept the expected performance data relates to. At 1220, a new discussion thread can be created relating to the new evidence item. The discussion thread can allow for other players in the interactive learning game to view the new evidence item and share comments. It can be appreciated that through continuing to refine solutions, players can learn additional perspective on addressing future problem statements. Additionally, adding new evidence items associated with an existing problem statement provides for new possible solution concepts. Thus, solution concepts can continue to evolve over time becoming more efficient. It can be further appreciated that new players to the interactive learning method can benefit from refined solutions offering practical expectation for utilizing the solution.

Figure 13:
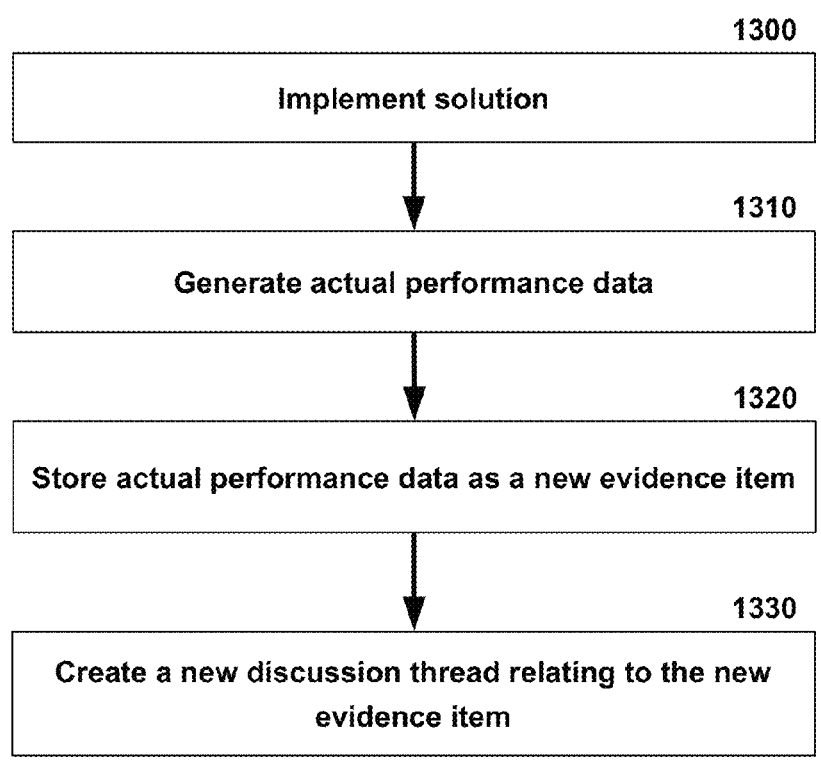
FIG. 13 is a flow diagram of an exemplary, non-limiting embodiment for sharing actual performance data of a solution.

FIG. 13 is a flow diagram of an exemplary, non-limiting embodiment for sharing actual performance data of a solution. At 1300 a solution is implemented. For example, regarding a problem statement dealing with setting up a product booth at a product fair, implementing the solution would be actually attending the product fair. In one embodiment, a player can select whether they have implemented the solution concept. In another embodiment, a player can identify a prospective date when they plan to implement the solution. At 1310, actual performance data can be generated. For example, the method providing for querying a player to submit actual performance data. In one embodiment, based on a date submitted by a player for implementation, the method can delay in querying a player for actual performance data until after the date of implementation. It can be appreciated that the submission of actual performance data could be a video, a narrative, a document, an interview, data, a quote, etc.

At 1320, actual performance data can be stored as a new evidence item. The new evidence item can be associated with the problem statement and/or the solution concept. At 1330, a new discussion thread can be created relating to the new evidence item.

Figure 14:
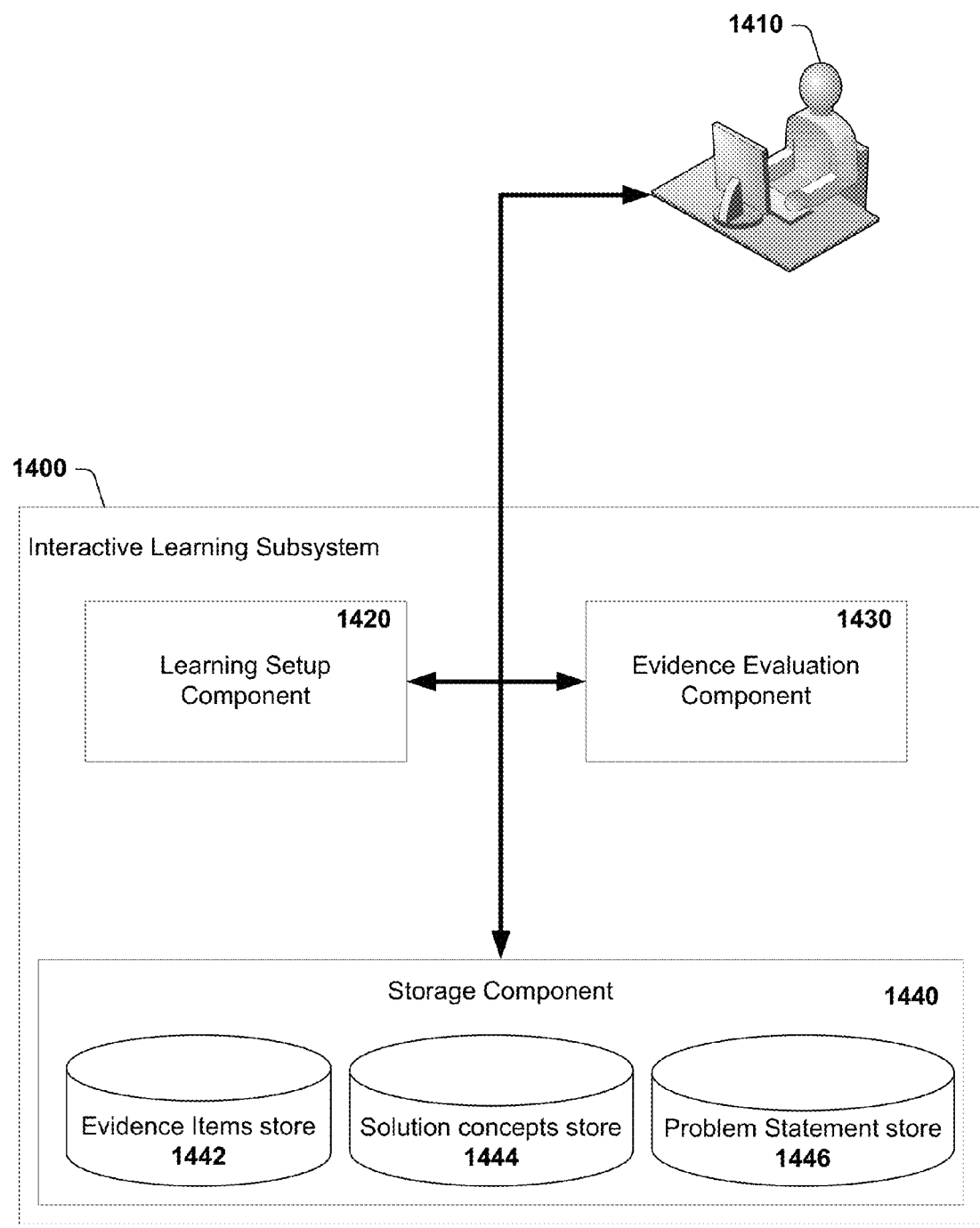
FIG. 14 is a block diagram of an exemplary, non-limiting embodiment for an interactive learning subsystem that can allow a player to evaluate evidence.

FIG. 14 is a block diagram of an exemplary, non-limiting embodiment for an interactive learning subsystem 1400 that can allow a player to evaluate evidence. A storage component 1440 can be configured to store a plurality of problem statements 1446, a plurality of evidence items 1442, and a plurality of solution concepts 1444 employable in a game by a variety of players wherein evidence items and solution concepts are associated with at least one problem statement. A learning setup component 1420 can be configured to allow a player to select at least one problem statement, retrieve evidence items associated with the at least one problem statement, and provide the evidence items associated with the at least one problem statement for review by a player. An evidence evaluation component 1430 can be configured to query the player regarding the plurality of evidence items associated with the at least one problem statement and generate evidence evaluation data based on the query. Evidence evaluation data can be one of an evaluation of relevancy of an evidence item, a comparison of relevancy versus a different evidence item, an explanation of relevancy by a player, etc.

Figure 15:
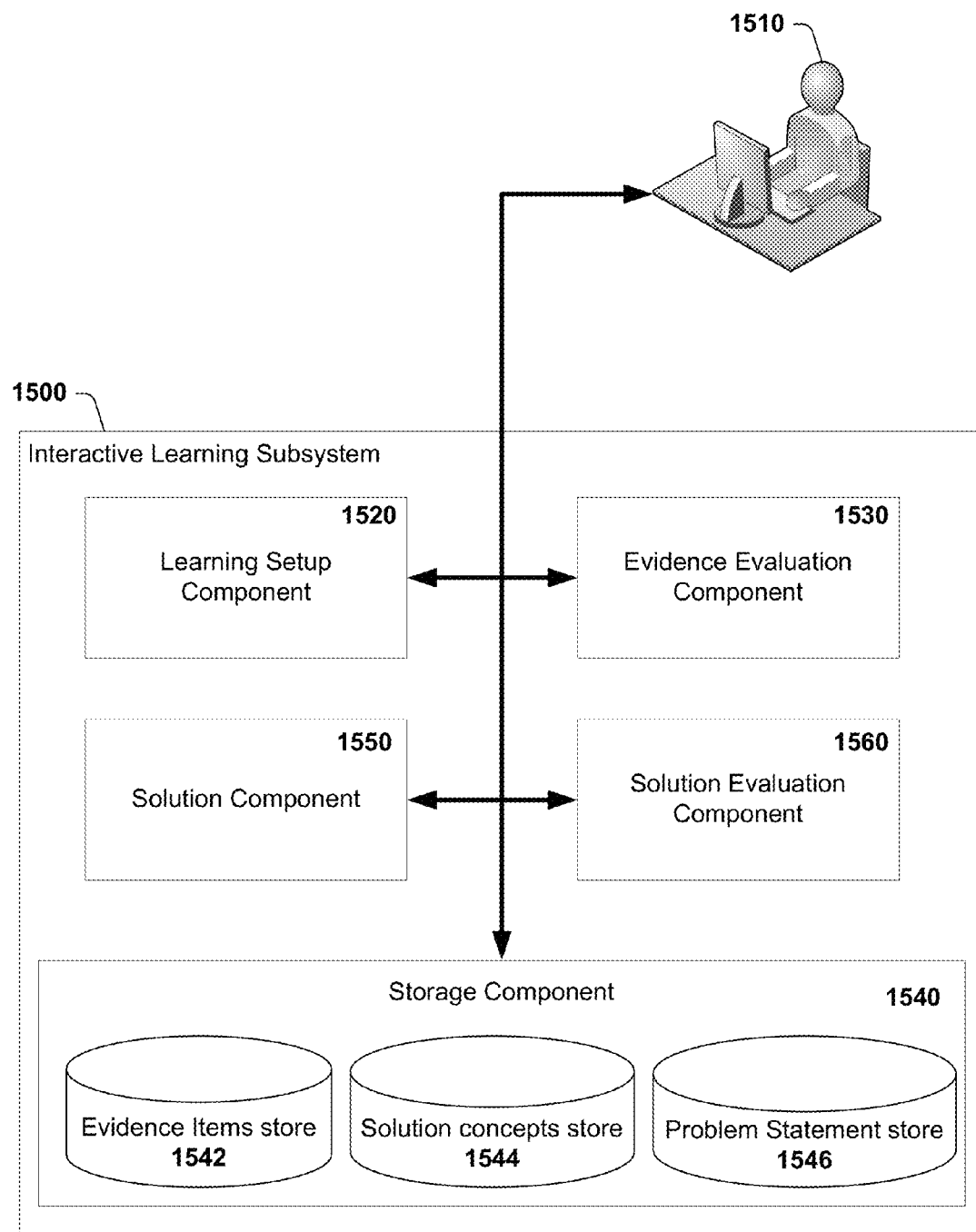
FIG. 15 is a block diagram of an exemplary, non-limiting embodiment for an interactive learning subsystem that can allow a player to share solution concepts.

FIG. 15 is a block diagram of an exemplary, non-limiting embodiment for an interactive learning subsystem 1500 that can allow a player to share solution concepts. It can be appreciated that Learning setup component 1520 and evidence evaluation component 1530 can offer functionality as described with regards to FIG. 14. In one embodiment, a solution component 1550 can be configured to allow a player to select at least one solution wherein the solution is at least one of an automatically generated solution concept based on the evidence evaluation data, a player selected solution concept, or a player created solution concept.

In one embodiment, the system can also include a solution evaluation component 1560 configured to query the player and generate at least one of expected performance data or actual performance data associated with the solution. In another embodiment, expected performance data or actual performance data can be stored as a new evidence item associated with the at least one problem statement or solution concept. Solution evaluation component 1560 can also be configured to further create a new discussion thread, via a discussion platform, relating to the new evidence item.

Figure 16:
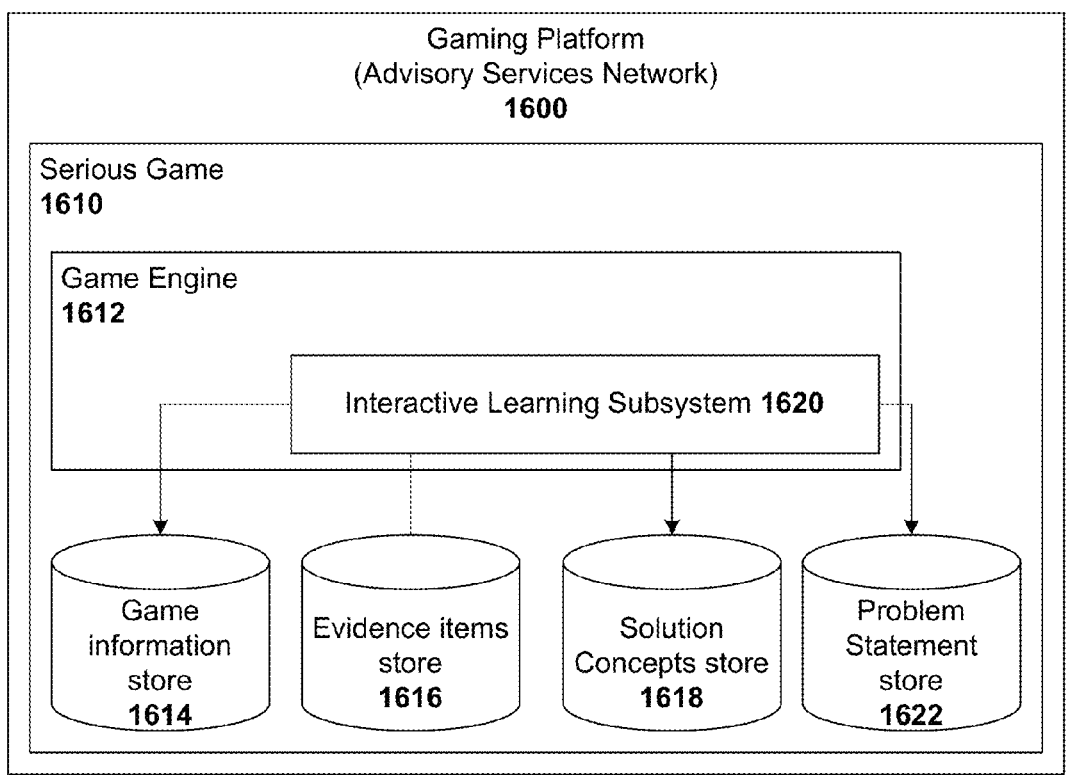
FIG. 16 is a block diagram illustrating an exemplary, non-limiting advisory services network system in accordance with one or more embodiments.

FIG. 16 illustrates a block diagram of an exemplary, non-limiting advisory services network in accordance with one or more embodiments. As shown in FIG. 16, a gaming platform 1600 can implement functionality of an advisory service network described herein. Gaming platform 1600 can host, e.g., execute, a serious game 1610 based upon a complex problem faced by a sponsor, e.g., an enterprise entity or other organization.

The serious game 1610 can include a game engine 1612 configured to manage execution of the serious game. The serious game 1610 further includes a plurality of data stores such as a game information store 1614, an evidence items store 1616, a solution concept store 1618, and a problem statement store 1622. The game information store 1614 can store data game-related information such as scene information on a plurality of scenes of serious game 1610 and associated narrative information. The evidence items store can store a plurality of evidence items of serious game 1610. The solution concepts store can store a plurality of solution concepts of serious game 1610. The problem statement store 1622 can store a plurality of problem statement of serious game 1610. Game engine 1612 can include a interactive learning subsystem 1620 configured to review and rank evidence items associated with a problem statements.

Exemplary Networked and Distributed Environments

One of ordinary skill in the art can appreciate that the various embodiments of interactive learning systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the interactive learning mechanisms as described for various embodiments of the subject disclosure.

Figure 17:
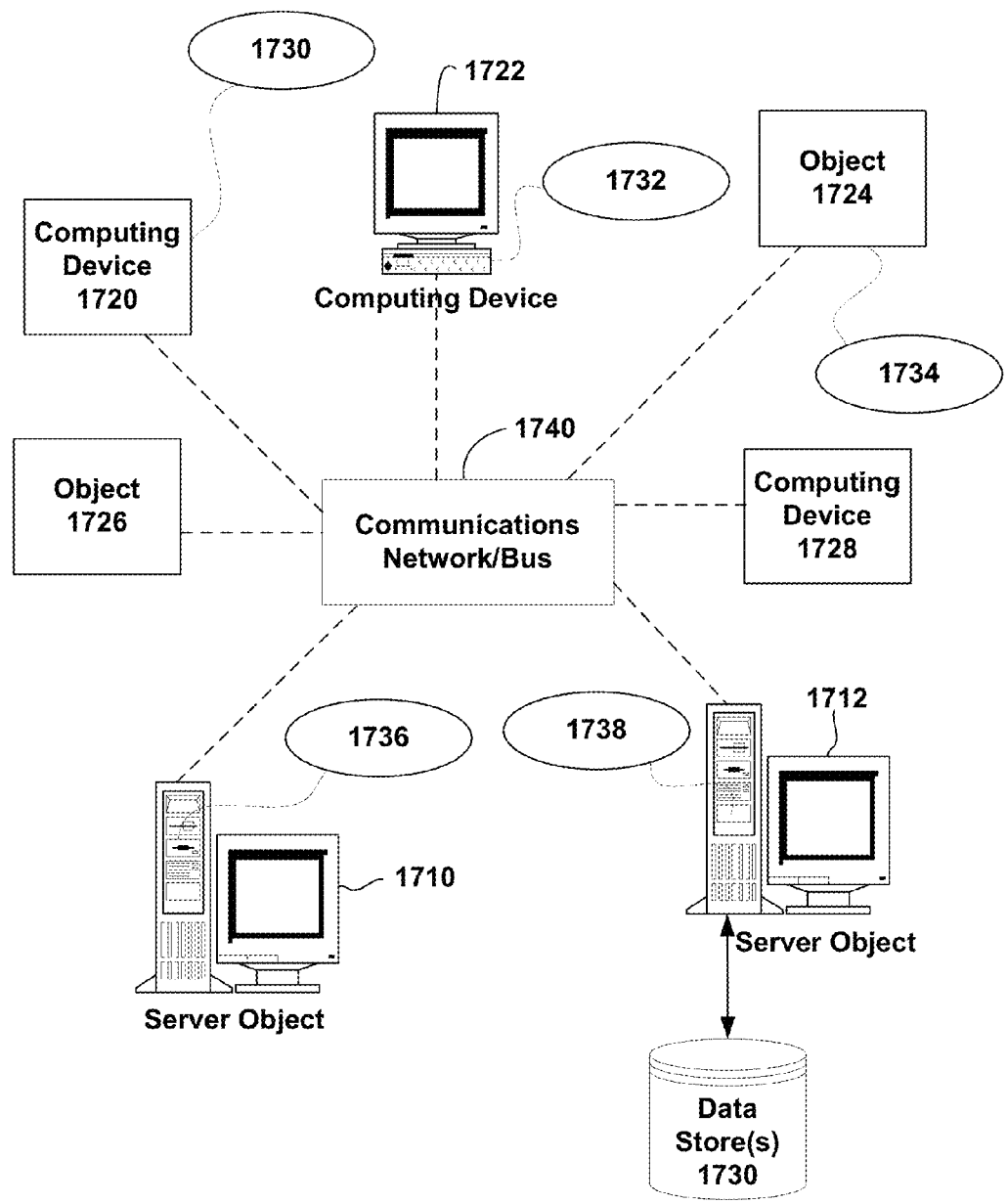
FIG. 17 is a block diagram representing exemplary non-limiting networked environments in which various embodiments described herein can be implemented.

FIG. 17 provides a schematic diagram of an exemplary networked or distributed computing environment. The distributed computing environment comprises computing objects 1710, 1712, etc. and computing objects or devices 1720, 1722, 1724, 1726, 1728, etc., which may include programs, methods, data stores, programmable logic, etc., as represented by applications 1730, 1732, 1734, 1736, 1738. It can be appreciated that computing objects 1710, 1712, etc. and computing objects or devices 1720, 1722, 1724, 1726, 1728, etc. may comprise different devices, such as personal digital assistants (PDAs), audio/video devices, mobile phones, MP3 players, personal computers, laptops, etc.

Each computing object 1710, 1712, etc. and computing objects or devices 1720, 1722, 1724, 1726, 1728, etc. can communicate with one or more other computing objects 1710, 1712, etc. and computing objects or devices 1720, 1722, 1724, 1726, 1728, etc. by way of the communications network 1740, either directly or indirectly. Even though illustrated as a single element in FIG. 17, communications network 1740 may comprise other computing objects and computing devices that provide services to the system of FIG. 17, and/or may represent multiple interconnected networks, which are not shown. Each computing object 1710, 1712, etc. or computing object or device 1720, 1722, 1724, 1726, 1728, etc. can also contain an application, such as applications 1730, 1732, 1734, 1736, 1738, that might make use of an API, or other object, software, firmware and/or hardware, suitable for communication with or implementation of the interactive learning systems and methods provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 17, as a non-limiting example, computing objects or devices 1720, 1722, 1724, 1726, 1728, etc. can be thought of as clients and computing objects 1710, 1712, etc. can be thought of as servers where computing objects 1710, 1712, etc., acting as servers provide data services, such as receiving data from client computing objects or devices 1720, 1722, 1724, 1726, 1728, etc., storing of data, processing of data, transmitting data to client computing objects or devices 1720, 1722, 1724, 1726, 1728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1740 or bus is the Internet, for example, the computing objects 1710, 1712, etc. can be Web servers with which other computing objects or devices 1720, 1722, 1724, 1726, 1728, etc. communicate via any of a number of known protocols, such as the hypertext transfer protocol (HTTP). Computing objects 1710, 1712, etc. acting as servers may also serve as clients, e.g., computing objects or devices 1720, 1722, 1724, 1726, 1728, etc., as may be characteristic of a distributed computing environment.

Exemplary Computing Device

As mentioned, advantageously, the techniques described herein can be applied to any device where it is desirable to interactively learn. It can be understood, therefore, that handheld, portable and other computing devices and computing objects of all kinds are contemplated for use in connection with the various embodiments, i.e., anywhere where players of a game can contribute. Accordingly, the below general purpose remote computer described below in FIG. 18 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 18:
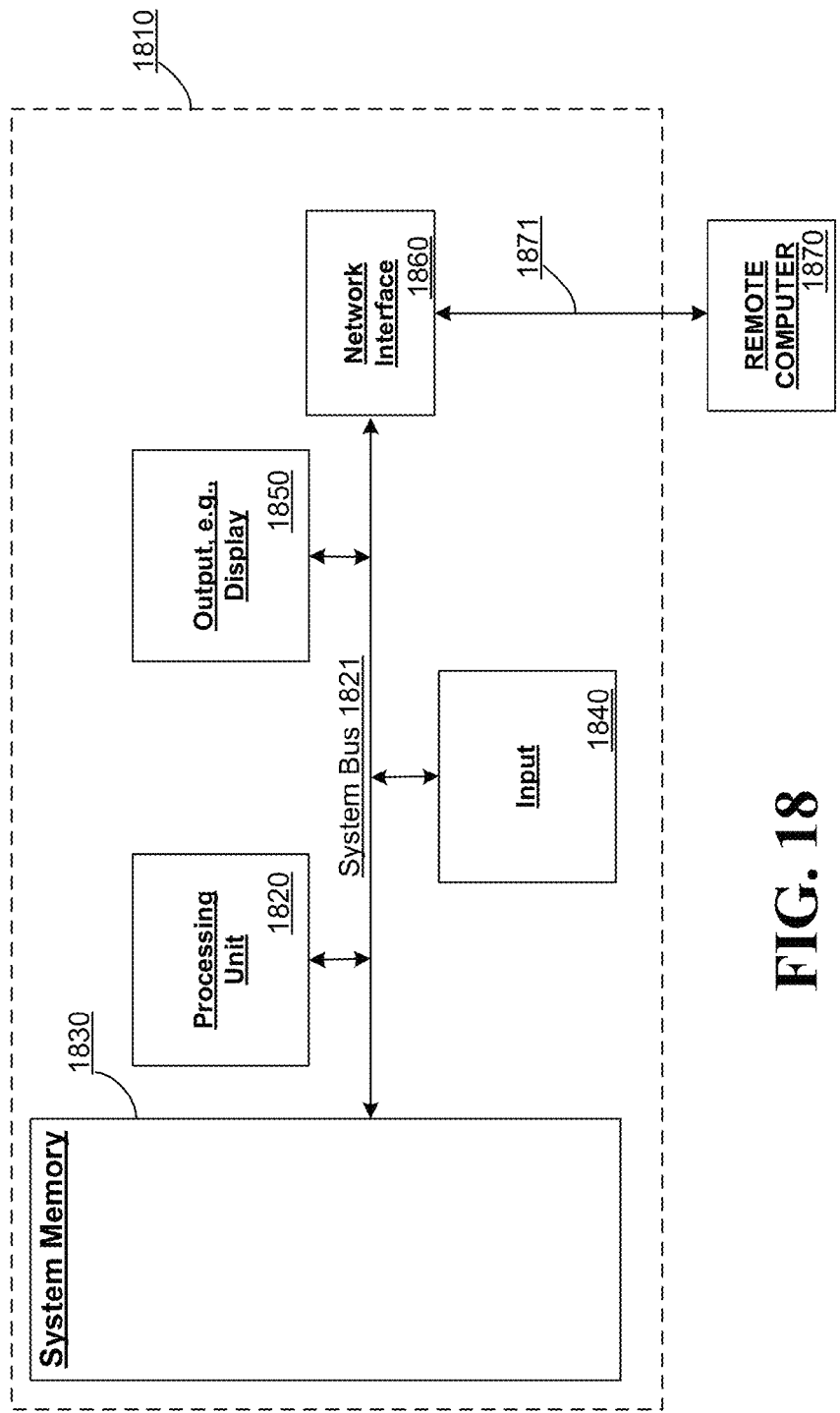
FIG. 18 is a block diagram representing an exemplary non-limiting computing system or operating environment in which one or more aspects of various embodiments described herein can be implemented.

FIG. 18 thus illustrates an example of a suitable computing system environment 1800 in which one or aspects of the embodiments described herein can be implemented, although as made clear above, the computing system environment 1800 is only one example of a suitable computing environment and is not intended to suggest any limitation as to scope of use or functionality. In addition, the computing system environment 1800 is not intended to be interpreted as having any dependency relating to any one or combination of components illustrated in the exemplary computing system environment 1800.

With reference to FIG. 18, an exemplary remote device for implementing one or more embodiments includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of computer readable media and can be any available media that can be accessed by computer 1810. The system memory 1830 may include computer storage media in the form of volatile and/or nonvolatile memory such as read only memory (ROM) and/or random access memory (RAM). By way of example, and not limitation, system memory 1830 may also include an operating system, application programs, other program modules, and program data. According to a further example, computer 1810 can also include a variety of other media (not shown), which can include, without limitation, RAM, ROM, EEPROM, flash memory or other memory technology, compact disk (CD)-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1810 through input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other remote media consumption or transmission device, and may include any or all of the elements described above relative to the computer 1810. The logical connections depicted in FIG. 18 include a network 1872, such as a local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to provide incentives for gaming input.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. An interactive learning subsystem of a network gaming platform, comprising:
    a storage component configured to store a plurality of complex business problem statements, a plurality of evidence items, and a plurality of solution concepts employable in a collaborative game by a variety of players wherein evidence items and solution concepts are associated with at least one complex business problem statement, and wherein the active complex business problem statements indicate that complex business problems arise from at least one of the following: a series of business changes, rapid growth of businesses, technology changes, and/or technological limitations;
    a learning setup component configured to execute computer-readable instructions with a processor to allow a player to select at least one complex business problem statement, retrieve evidence items associated with the at least one complex business problem statement, and provide the evidence items associated with the at least one complex business problem statement for review by a player; and an evidence evaluation component configured to execute computer-readable instructions with the processor to query the player regarding the plurality of evidence items associated with the at least one complex business problem statement and generate evidence evaluation data based on the query.

2. The interactive learning subsystem of claim 1, wherein the evidence item is at least one of a quote, an environment, a situation, data, a narrative, a video, a discussion board thread, a document, an interview, the complex business problem statement, a leader board, or a solution concept.

3. The interactive learning subsystem of claim 1, further comprising:
a solution component configured to allow a player to select at least one solution wherein the solution is at least one of an automatically generated solution concept based on the evidence evaluation data, a player selected solution concept, or a player created solution concept.

4. The interactive learning subsystem of claim 1, further comprising:
a solution evaluation component configured to query the player and generate at least one of expected performance data or actual performance data associated with the solution.

5. The interactive learning subsystem of claim 4, wherein at least one of expected performance data or actual performance data is stored as a new evidence item associated with the at least one complex business problem statement.

6. The interactive learning subsystem of claim 5, wherein the solution evaluation component further creates a new discussion thread, via a discussion platform, relating to the new evidence item.

7. A computer-readable storage device comprising computer-readable instructions that, in response to execution, cause a computing system including at least one processor to perform operations, comprising:
storing a plurality of complex business problem statements and a plurality of evidence items employable in a collaborative game by a variety of players wherein evidence items are associated with at least one complex business problem statement;
determining an active complex business problem statement based upon a player selection, wherein the complex business problem statement states an apparent problem for a business which related to at least one of the following: dataflow limitations faced by the business, information sharing limitations faced by the business, capturing transmitting real-time data for the business, transmitting real-time data for the business, securing resources for the business, securing equipment for the business, brainstorming future innovations for the business;
querying the player regarding the plurality of evidence items associated with the active complex business problem statement; and
generating evidence evaluation data based on the querying.

8. The computer-readable storage device of claim 7, further comprising:
determining at least one solution wherein the solution is at least one of an automatically generated solution concept based on the evidence evaluation data, a player selected solution concept, or a player created solution concept.

9. The computer-readable storage device of claim 8, further comprising:
querying the player regarding the at least one solution; and
generating at least one of expected performance data or actual performance data based upon the querying.

10. The computer-readable storage device of claim 9, wherein at least one of expected performance data or actual performance data is stored as a new evidence item associated with the complex business problem statement.

11. The computer readable storage device of claim 10, further comprising:
creating a new discussion thread, via a discussion platform, relating to the new evidence item.

12. A computing system, comprising:
at least one processor;
at least one output interface for connecting an output device to the computing system; and
a memory coupled to the at least one processor, the memory storing computer-readable instructions that, in response to execution, cause the computing system to perform operations, comprising:
storing a plurality of complex business problem statements, a plurality of solution concepts for solving at least one complex business problem, and a plurality of evidence items employable in a game by a variety of collaborative players wherein evidence items and solution concepts are associated with at least one complex business problem statement;
determining an active complex business problem statement based upon a player selection;
displaying on the output device a plurality of active evidence items wherein the plurality of active evidence items are evidence items associated with the active complex business problem statement;
generating a degree of relevance for the plurality of active evidence items based upon a player query;
determining a rank for the plurality of active evidence items based upon the degree of relevance; and
evaluating the plurality of active evidence items based on the rank.

13. The computing system of claim 12, wherein the plurality of evidence items include at least one of the following: a quote, an environment, a situation, data, a narrative, a video, a discussion board thread, a document, an interview, the problem statement, a leader board, or a solution concept.

14. The computing system of claim 12, wherein evaluating of the plurality of active evidence items includes at least one of the following: disregarding an active evidence item, querying the player to review the active evidence item, or querying the player to determine a weight of the active evidence item.

15. The computing system of claim 12, further comprising computer-readable instructions that, in response to execution, cause the computing system to perform:
determining at least one solution, wherein the solution is at least one of the following: an automatically generated solution concept based on the evaluating, a player selected solution concept, or a player created solution concept.

16. The computing system of claim 15, further comprising computer-readable instructions that, in response to execution, cause the computing system to perform:
generating expected performance data based on the solution; and
storing expected performance data as a new evidence item associated with the active problem statement.

17. The computing system of claim 16, further comprising computer-readable instructions that, in response to execution, cause the computing system to perform:

creating a new discussion thread, via a discussion platform, relating to the new evidence item.

18. The computing system of claim 12, wherein the active complex business problem statement indicates that the complex business problem arises from at least one of the following: a series of business changes, rapid growth of businesses, technology changes, and/or technological limitations.

19. The computing system of claim 12, further comprising computer-readable instructions that, in response to execution, cause the computing system to perform:

generating actual performance data based upon implementing a solution to the complex business problem; and storing actual performance data as a new evidence item associated with the active problem statement.

20. The computing system of claim 19, further comprising computer-readable instructions that, in response to execution, cause the computing system to perform:

creating a new discussion thread, via a discussion platform, relating to the new evidence item.

\* \* \* \* \*